US009462101B2

(12) United States Patent
Kreiner et al.

(10) Patent No.: US 9,462,101 B2
(45) Date of Patent: Oct. 4, 2016

(54) METHODS AND APPARATUS TO ELECTRONICALLY TAG A CIRCUIT PAIR

(71) Applicant: AT&T Intellectual Property I, L.P., Atlanta, GA (US)

(72) Inventors: Barret M. Kreiner, Woodstock, GA (US); Ryan Schaub, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/571,234

(22) Filed: Dec. 15, 2014

(65) Prior Publication Data
US 2016/0173674 A1 Jun. 16, 2016

(51) Int. Cl.
*H04M 1/24* (2006.01)
*H04M 3/08* (2006.01)
*H04M 3/22* (2006.01)
*G06K 7/10* (2006.01)

(52) U.S. Cl.
CPC ............ *H04M 1/24* (2013.01); *G06K 7/10366* (2013.01)

(58) Field of Classification Search
CPC ...... H04M 3/08; H04M 1/24; H04M 3/2209; H04M 3/303; H04M 3/36; H04M 2201/14; H04M 3/2236; H04M 3/229
USPC .............. 379/1.01, 1.03, 1.04, 15.03, 142.01
See application file for complete search history.

(56) References Cited

U.S. PATENT DOCUMENTS

| | | | |
|---|---|---|---|
| 5,802,143 A * | 9/1998 | Borchering | H04M 3/30 379/12 |
| 6,002,746 A * | 12/1999 | Mulcahy | H04M 3/22 379/22 |
| 6,201,853 B1 * | 3/2001 | Butler | H04M 1/24 379/21 |
| 7,286,646 B2 * | 10/2007 | Gunn | H04M 3/229 379/22 |
| 7,346,158 B1 | 3/2008 | Naidu | |
| 7,385,973 B1 * | 6/2008 | Johnson | H04L 12/4675 370/389 |
| 7,656,811 B2 | 2/2010 | Young | |
| 7,876,815 B2 | 1/2011 | Wang et al. | |
| 8,004,962 B2 | 8/2011 | Yang et al. | |
| 8,223,859 B2 | 7/2012 | Heidari et al. | |
| 8,369,484 B2 | 2/2013 | Wang et al. | |
| 8,437,452 B2 | 5/2013 | Beattie, Jr. et al. | |
| 8,675,469 B2 | 3/2014 | Anschutz et al. | |
| 2002/0057763 A1 | 5/2002 | Sisk et al. | |
| 2006/0245439 A1 * | 11/2006 | Sajassi | H04L 12/2881 370/400 |
| 2007/0036319 A1 * | 2/2007 | Tighe | H04M 3/42314 379/202.01 |
| 2009/0161677 A1 * | 6/2009 | Zheng | H04L 12/2869 370/392 |
| 2009/0252207 A1 | 10/2009 | Brost et al. | |
| 2013/0230151 A1 | 9/2013 | Beattie, Jr. et al. | |

\* cited by examiner

*Primary Examiner* — Quoc D Tran
(74) *Attorney, Agent, or Firm* — Hanley, Flight & Zimmerman, LLC

(57) ABSTRACT

Methods and apparatus to electronically tag a circuit pair are disclosed herein. Example methods include generating circuit identifying information to be included in a tag, transmitting the circuit identifying information to a first network element and to a portable circuit probe, and electronically tagging the circuit pair by applying a tone to the circuit pair at the first network element. In some examples, the tone is encoded to include the tag. Example methods additionally include notifying the portable circuit probe that the circuit pair has been electronically tagged. In some examples, the tag is transmitted to the first network element via the circuit pair and, if the first network element fails to acknowledge receipt of the circuit identifying information, via an out-of-band network.

17 Claims, 16 Drawing Sheets

METHODS AND APPARATUS TO ELECTRONICALLY TAG A CIRCUIT PAIR

FIELD OF THE DISCLOSURE

This disclosure relates generally to bonded circuit pairs and, more particularly, to electronically tagging a bonded circuit pair/subscriber line.

BACKGROUND

Service providers provide telephone, cable television, and Internet services, etc., to customer homes via copper wiring. Typically, the wiring extends from a central office to various neighborhood serving area interfaces and then to individual customer homes. Traditionally, circuit based color coding schemes were used to "label" or "tag" the individual wires so that a technician could use the coloring of the wires to identify a wire associated with a service order. More recently, however, digital subscriber line technologies are being provided at the serving area interfaces and original network wire color coding schemes are no longer being followed. In addition, to support newer technologies, original circuit network connections are being cut out and replaced with new feeds coming from adjacent neighborhood serving area interfaces. The wiring environment is further complicated by the usage of two bonded circuit pairs to support a single residential customer, and up to eight bonded circuit pairs to support a single commercial customer. When a service disruption occurs, a technician assigned to investigate the disruption first has to identify the circuit in need of repair. Likewise, when new DSL service is to be supplied to a customer home via an existing bonded circuit pair(s), a field operator may be tasked with identifying the physical wires that correspond to the bonded circuit pair. Unfortunately, the disorganized and sometimes chaotic wiring environment greatly hinders the ability of the technician to make the circuit pair identification, thereby increasing the labor and time required to address a service disruption.

Figure 1:
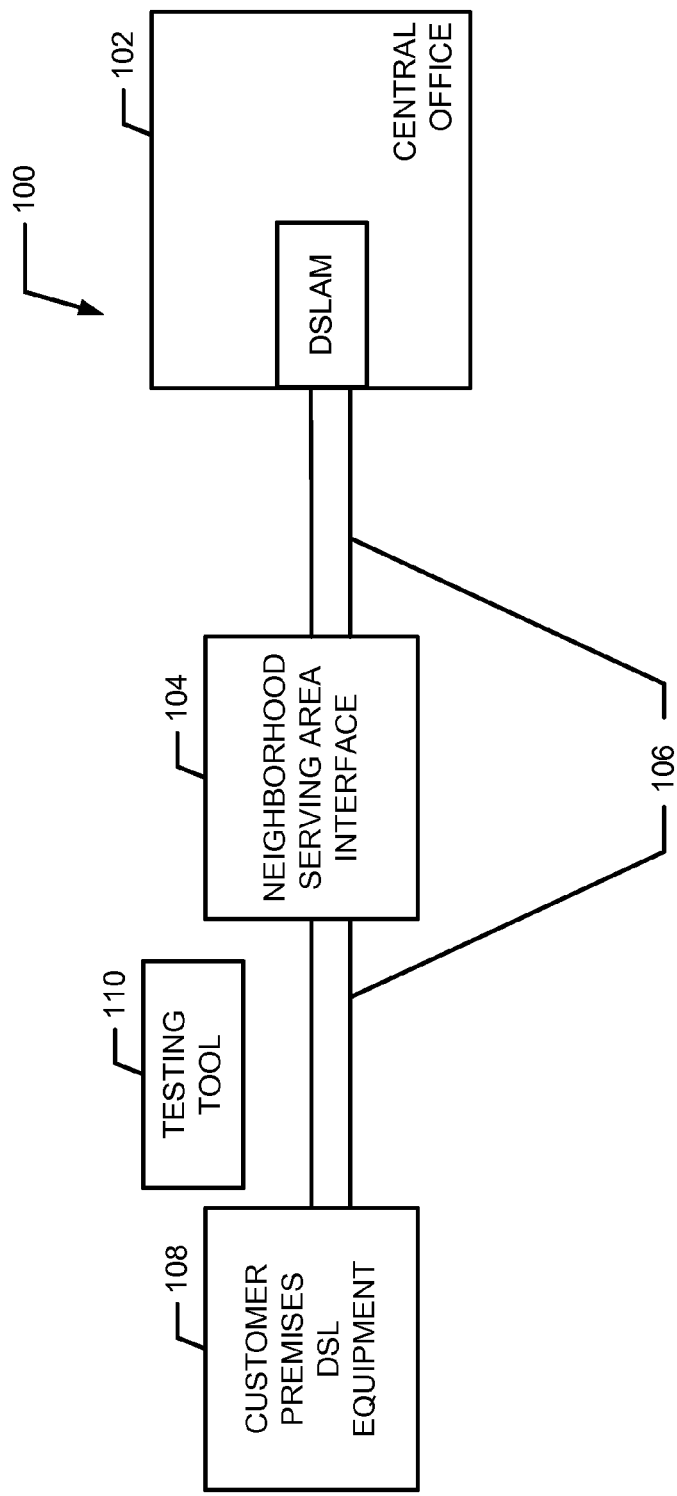
FIG. 1 is a block diagram of an example digital subscriber services network by which digital subscriber services are supplied to subscribers.

Wherever possible, the same reference numbers will be used throughout the drawing(s) and accompanying written description to refer to the same or like parts. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Methods and apparatus to electronically tag a circuit pair are disclosed herein. In some examples, a method to electronically tag a circuit pair includes generating circuit identifying information to be included in a tag, transmitting the circuit identifying information to a first network element and to a portable circuit probe, and electronically tagging the circuit pair by applying a tone to the circuit pair at a first network element. In some examples, the tone is encoded to include the tag. Some example methods further include notifying the portable circuit probe that the circuit has been electronically tagged.

In additional example methods, the tag information is transmitted to the first network element via the circuit pair and, if the first network element fails to acknowledge receipt of the tag, the tag is transmitted to the first network element via an out-of-band network. The out-of-band network can be implemented as an 802.11x compliant network, a cellular telephone network, and an ad-hoc network. In some examples, the first network element includes at least one of a digital subscriber line access multiplexer, a circuit switch, a video ready access device, and a consumer premises equipment modem.

Some example methods further include transmitting the circuit identifying information to a second network element, and instructing the second network element to transmit the tag including the circuit identifying information on the circuit pair.

Also disclosed herein are tangible computer readable storage medium including computer readable instructions which, when executed, cause a computer to perform operations. In some examples, the operations include transmitting a reference sequence to a first network element and to a portable circuit probe and electronically tagging a circuit pair by applying a tone to the circuit pair at a first network element. The tone is encoded to include the reference sequence. Further operations include notifying the portable circuit probe that the circuit has been electronically tagged. In some examples, the reference sequence is transmitted to the first network element via the circuit pair, and the operations further include determining whether the first network element acknowledges receipt of the reference sequence, and if the first network element fails to acknowledge receipt of the reference sequence, transmitting the reference sequence to the first network element via an out-of-band network.

Example apparatus disclosed herein include a memory having machine readable instructions stored thereon and a processor to execute the instructions to perform operations. Example operations include generating identifying information to be included in the tag and transmitting the identifying information to a first network element and to a portable testing tool. The operations additionally include electronically tagging the digital subscriber line by applying a tone to the digital subscriber line at the first network element. The tone is encoded to include the identifying information. Further operations include notifying the portable testing tool that the digital subscriber line has been electronically tagged.

Digital subscriber services including telephone, cable television, and Internet services, etc., are supplied to subscriber/customer homes via a combination of optical fiber and copper wiring. Typically, the wiring extends from a central office to various neighborhood serving area interfaces and then to individual customer homes. Circuit-based color coding schemes that were traditionally used to "label" or "tag" the individual wires are, in some cases, no longer being used and/or sporadically being used. Additionally, newer technologies that are being used to generate/supply the digital subscriber services are not in conformance with pre-existing color coding schemes. As a result, field operators/technicians tasked with restoring service to a subscriber home/customer premises are finding it more and more difficult to determine which of several bonded pairs/wires or other wires/cables are being used to carry service to customer premises. On occasion, the lack of wire labeling/tagging information will cause a technician to confuse a healthy subscriber line with a subscriber line in need of repair. In some such circumstances, the confusion may cause a technician to disrupt service to an otherwise healthy subscriber line thereby increasing customer dissatisfaction.

To aid in the identification of subscriber lines, the methods, systems, and apparatus disclosed herein use a tone generator to electronically tag a subscriber line with identifying information. To prevent interference with information being transmitted to the subscriber home on the subscriber line, the electronic tag is generated in or near a frequency range between 0 and 10 kHz. As the 0-10 kHz frequency range is traditionally not used by existing digital subscriber service systems, the electronic tag will not interfere with or distort digital subscriber service information being transmitted on a subscriber line. In many cases, central offices, customer premises, and neighborhood serving area interfaces are equipped with tone generators/modems capable of generating frequency tones in the desired range such that significant modification will not be required to enable the technology. In some examples, a portable circuit probe (also referred to as a "testing tool") positioned proximally to a subscriber line being tested can be used to inductively detect the electronic tag and decode identifying information included in the tag. Thus, the identity of the subscriber line can be determined without disconnecting the subscriber line being tested. In some examples, instead of electronically tagging a subscriber line in a continuous fashion, the tag is applied: 1) when a subscriber indicates that a service disruption has occurred, 2) when a loss of sync occurs between the customer premises and a neighborhood serving area interface and/or the central office, and/or 3) when repair or maintenance of the subscriber line is scheduled. Further, the customer premises, the neighborhood serving area interface, and/or the central office can be configured to electronically tag the subscriber line with information indicating the source of the tag. Thus, a field operator can use the source information included in a detected tag to determine that the portion of the subscriber line extending from the source to the point at which the subscriber line is being tested is intact. Likewise, if a DSL service is to be installed on a subscriber line, the central office, customer premises and/or central office can be instructed to electronically tag the subscriber line and the field operator can use the testing tool to detect the electronic tags and thereby confirm that a subscriber line is the appropriate subscriber line before taking any action that might otherwise disturb the subscriber line. Thus, the likelihood of inadvertently disrupting service to another customer is reduced and/or eliminated. In addition, if the field operator identifies a bonded copper pair believed to be a subscriber line of interest but the testing tool does not detect an electronic tag on the line, the field operator can use the testing tool to induce the customer premises, the central office and/or any intermediate neighborhood interfaces to electronically tag the line. The testing tool is then used to detect the induced tag and use the information contained in the tag to determine the identity of the subscriber line.

Thus, the methods, systems, apparatus and articles of manufacture disclosed herein reduce the risk of service outages due to the misidentification of subscriber lines, reduce the amount of time and manpower needed to repair a faulty subscriber line, reduce the amount of time needed to install new DSL service, reduce the amount of time needed to restore a DSL service, and, in some cases, allow for the testing of the integrity of a subscriber line without need to send a technician into the field.

FIG. 1 is a block diagram of an example digital subscriber line ("DSL") network 100 by which DSL services are supplied by an example central office 102 to an example neighborhood serving area interface 104 via an example digital subscriber line 106 (referred to as the "subscriber line"). In some examples the subscriber line 106 is implemented using one or more segments of twisted-pair telephone wire (e.g., a bonded copper pair of wires). The DSL services are further supplied via the subscriber line 106 from the neighborhood serving area interface 104 to an example customer premises 108. An example testing tool is positioned anywhere along the subscriber line 106 to detect an electronic tag placed on the subscriber line 106 by any of the central office 102, the neighborhood serving area interface 104, the customer premises 108, and/or the testing tool.

In some examples, the system is initialized by sending out respective reference sequences for one or more, or all, respective subscriber lines to each of the example customer premises 108, the example NSAI 104, the example testing tool 110. Later, when repair of one the subscriber lines (e.g., the subscriber line 106) is needed or a new DSL service is to be supplied to any customer premises (e.g., the customer premises 108), the central office 102 electronically tags the associated subscriber line (e.g., the subscriber line 106) with the respective reference sequence and causes the customer premises 108 and/or the NSAI 104 to electronically tag the line with modified versions of the respective reference sequence. A field operator can then use the testing tool 110 to detect the tags at various locations on the subscriber line 106 in an attempt to isolate any portions of the subscriber line 106 that are in need of repair. In some examples, each circuit pair of a subscriber line can be individually tagged to allow for identification of issues with the individual pairs bonded to form the subscriber line.

Figure 2:
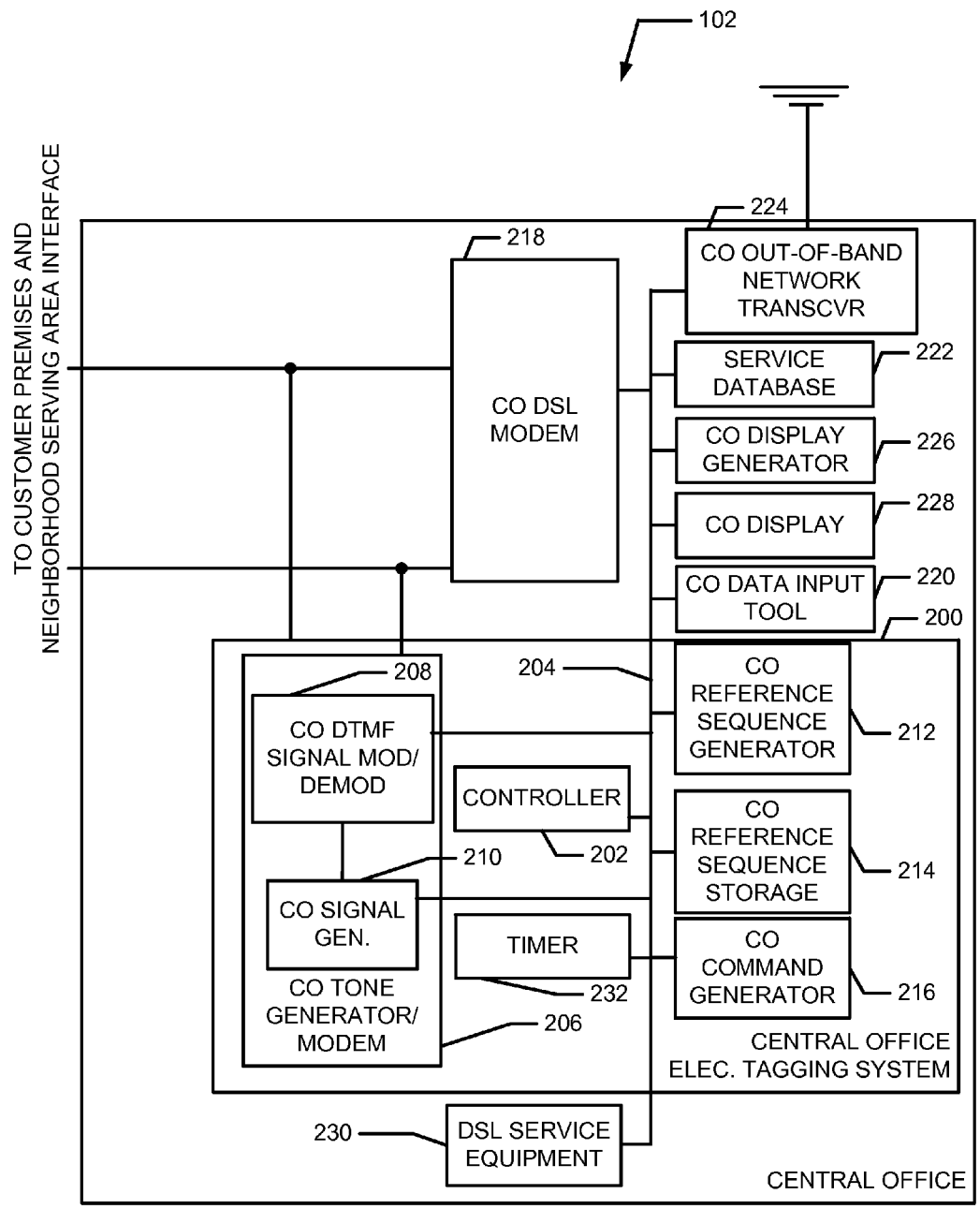
FIG. 2 is a block diagram of an example implementation of an example central office illustrated in FIG. 1.

FIG. 2 is a block diagram illustrating the central office 102. In some examples, an example electronic tagging system 200 installed at the central office 102 is configured to digitally tag the subscriber line 106 to thereby ease the identification of the subscriber line 106 by service personnel working in the field. In some examples, the central office ("CO") electronic tagging system 200 includes an example CO controller 202, coupled via an example communication bus 204 to an example CO tone generator/modem 206 having an example dual-tone multi-frequency signaling (DTMF) modulator/demodulator 208 and an example CO signal generator 210. The CO signal generator 210 generates signal(s) in the 0-10 kHz frequency range (e.g., which includes the voice band frequencies and the voice band guard frequencies). The CO DTMF signal modulator/demodulator 208 is configured to modulate the 0-10 kHz frequency signal(s) to thereby generate sixteen distinct signals. In some examples, the sixteen distinct signals represent the numerical digits 0-9, a "#" symbol, a "*" symbol, and the letters "A," "B," "C" and "D." The CO electronic tagging system 200 further includes an example CO reference sequence generator 212, an example reference sequence storage 214, and an example command generator 216, all of which are also coupled to the CO controller 202 via the communication bus 204. Example DSL service equipment supplies DSL services to the customer premises 108 (see FIG. 1) and neighborhood serving area interface 104 (see FIG. 1) via an example CO DSL modem 218. In some examples, an example CO data input tool 220 included at the central office 102 provides for the entry of information about service repair orders and/or corresponding system equipment which can be stored in an example CO service database 222. An example CO display generator 226 generates information to be displayed at an example CO display screen 228. As described further below, relevant information captured at the input tool 220 is also supplied to the CO reference sequence generator 212 of the CO electronic tagging system 200. An example out-of-band network transceiver 224 included at the central office 102 is used to communicate with the customer premises 108 (see FIG. 1), the neighborhood serving area interface 104 (see FIG. 1), and/or the testing tool (see FIG. 1) when communication via the subscriber line 106 is not possible due to a disruption of service caused by, for example, a break in the subscriber line 106.

For illustrative purposes, the central office 102 of FIG. 2 includes the example CO DSL modem 218 and example CO DSL service equipment 230 to provide DSL service to the customer premises 108. In practice, the central office 102 can include a digital subscriber line access multiplexer (DSLAM) and multiple central office DSL modems to provide DSL service to respective multiple customer premises via respective multiple subscriber lines.

The electronic tagging system 200 of FIG. 2 is configured to generate an electronic tag containing circuit identifying information and to place the electronic tag on the subscriber line 106 when, for example, a repair service is to be performed on the subscriber line 106. The electronic tag can then be detected by service personnel operating the testing tool of FIG. 1 and thereby used to confirm that the subscriber line 106 is indeed the subscriber line 106 on which repair is to be performed. In some examples, when DSL service supplied by the DSL service equipment to the customer premises 108 becomes disrupted, the example CO reference sequence generator 212 uses information supplied by service personnel at the example CO input tool 220 to generate circuit identifying information. In some examples, the CO input tool 220 is implemented using a keyboard, a touch pad, etc. In some examples, the information input at the CO input tool 220 includes circuit identifying information corresponding to the subscriber line 106 such as a BAN number associated with the subscriber line 106, a circuit identifier corresponding to the subscriber line 106, a pair number of a bonding group associated with the subscriber line 106, a service order number (if relevant) pertaining to a service order scheduled for the subscriber line 106, a modem serial number identifying the serial number of the tone generator, a device identifier identifying the source of the tag, etc.

Any and/or all of the information included in the circuit identifying information (e.g., the circuit attributes) is entered at the example CO input tool 220 when the DSL service supplied to the customer premises 108 is interrupted/disrupted. In some examples, the information is entered before a service interruption occurs. The entered information is supplied by the CO input tool 220 to the example CO reference sequence generator 212 via the example communication bus 204. The CO reference sequence generator 212 uses the information to generate a reference sequence. In some examples, the reference sequence is represented as "*BbanB*Ccircuit#pairC*AsoA*DsnD*#device*" where "ban" represents the ban number, "circuit#" represents the circuit identifier, "pair" represents the pair number of the bonding group, "so" represents the service order number, "sn" represents the modem serial number, "#device" represents the device identifier. In some examples, a device identifier value of "0" is used for tags generated at the central office 102 and/or the neighborhood serving area interface 104 and a device identifier value of "1" is used for tags generated at the customer premises 108. As shown, in some examples, each of the numeric fields is separated by one of the other signaling tones (e.g., A, B, C, D, *, #). In some examples, when appropriate, one or more of the numeric fields is omitted (e.g., when there is no BAN number, there is no bonded circuit pair #, etc.).

The example CO reference sequence generator 212 causes the generated reference sequence to be stored in the example reference sequence storage 214. To electronically tag the subscriber line 106, the example CO controller 202 causes the example CO DTMF signal modulator/demodulator 208 to access the reference sequence stored in the CO reference sequence storage 214 and further causes the example CO signal generator 210 to begin generating an unmodulated signal. The CO DTMF signal modulator/demodulator 208 encodes the reference sequence into a dual tone multi-frequency signal which is applied by the DTMF signal modulator/demodulator 208 to the subscriber line 106, thereby electronically tagging the circuit. In some examples, upon causing the subscriber line 106 to be electronically tagged, the CO command generator 216 generates a command that is transmitted by the example DSL network transceiver 224 to the customer premises 108 and/or the neighborhood serving area interface 104 indicating that the subscriber line 106 has been electronically tagged and instructing the customer premises 108 and/or neighborhood serving area interface 104 to begin monitoring for the tag. In some examples, the command is transmitted by the example out-of-band network transceiver 224 to the customer premises 108 and/or the neighborhood serving area interface 104.

In some examples, before electronically tagging the example subscriber line 106, the example CO controller 202 supplies the reference sequence to the example DSL network transceiver 224 for subsequent transmission to the customer premises 108 and the neighborhood serving area interface 104 104. As described further below, in some examples, the customer premises 108 and the neighborhood serving area interface 104 104 store the reference sequence for use in generating an electronic tag and/or for use in monitoring for the presence of the electronic tag to be generated by the central office 102. After the reference sequence is transmitted, the CO controller 202 awaits an acknowledgement from the customer premises 108 and/or the neighborhood serving area interface 104 indicating that the reference sequence has been received. In the event that such an acknowledgement is not received within a threshold timeframe, as measured by an example CO timer 232, the CO controller 202 causes the reference sequence to be supplied to the example out-of-band network transceiver 224 for transmission to the customer premises 108 and/or the neighborhood serving area interface 104 via an out-of-band network.

In some examples, before causing the subscriber line 106 to be tagged, the example CO controller 202 also supplies the reference sequence to the example DSL network transceiver 224 for subsequent transmission to the testing tool 110. The testing tool 110 stores the reference sequence for comparison to an electronic tag later detected on a subscriber line 106 being tested. If the stored reference sequence matches the reference sequence detected in an electronic tag on the subscriber line 106 being tested, the technician is assured that the subscriber line 106 being tested is the subscriber line 106 to be repaired.

In some examples, the example CO controller 202 is configured to receive an acknowledgement from the customer premises 108 and/or the neighborhood serving area interface 104 indicating that the electronic tag has been detected on the subscriber line 106. When such an acknowledgement is received, the CO controller 202 indicates that the subscriber line 106 is intact in the example CO service database 222. Thus, a break in the continuity of the subscriber line 106 can be eliminated as a cause of the service interruption allowing service personnel to investigate other possible causes.

In some examples, the example CO controller 202 does not cause the example CO DTMF signal modulator/demodulator 208 to electronically tag the subscriber line 106 but instead causes the example CO command generator 216 to command the customer premises 108 and/or neighborhood serving area interface 104 to electronically tag the circuit. The command is transmitted via the example CO DSL modem 218 and/or the example CO out-of-band network transceiver 224. After the command is issued, the CO controller 202 monitors the signals demodulated by the CO DTMF signal modulator/demodulator 208 to determine whether the electronic tag is subsequently detected. If no such electronic tag is detected within a threshold amount of time, the CO controller 202 may cause information to be entered into the CO service database 222 indicating that the example subscriber line 106 may no longer be intact. In addition, information indicating that the subscriber line 106 may no longer be intact may be displayed at the CO display screen 228. In some examples, the electronic tag is detected and the reference sequence included in the tag indicates that the neighborhood serving area interface 104 is the source of the tag. In some examples, two electronic tags may be detected and one such tag may include a reference sequence indicating that the tag originated from the customer premises 108 and another such tag may include a reference sequence indicating that the tag originated from the neighborhood serving area interface 104. In response to detecting the tags, the CO controller 202 causes information indicating that the subscriber line 106 is intact to be entered into the CO service database 222. In some examples, the CO display generator 226 may generate an informational message identifying the status of the subscriber line 106 to be displayed on the CO display screen 228.

Figure 3:
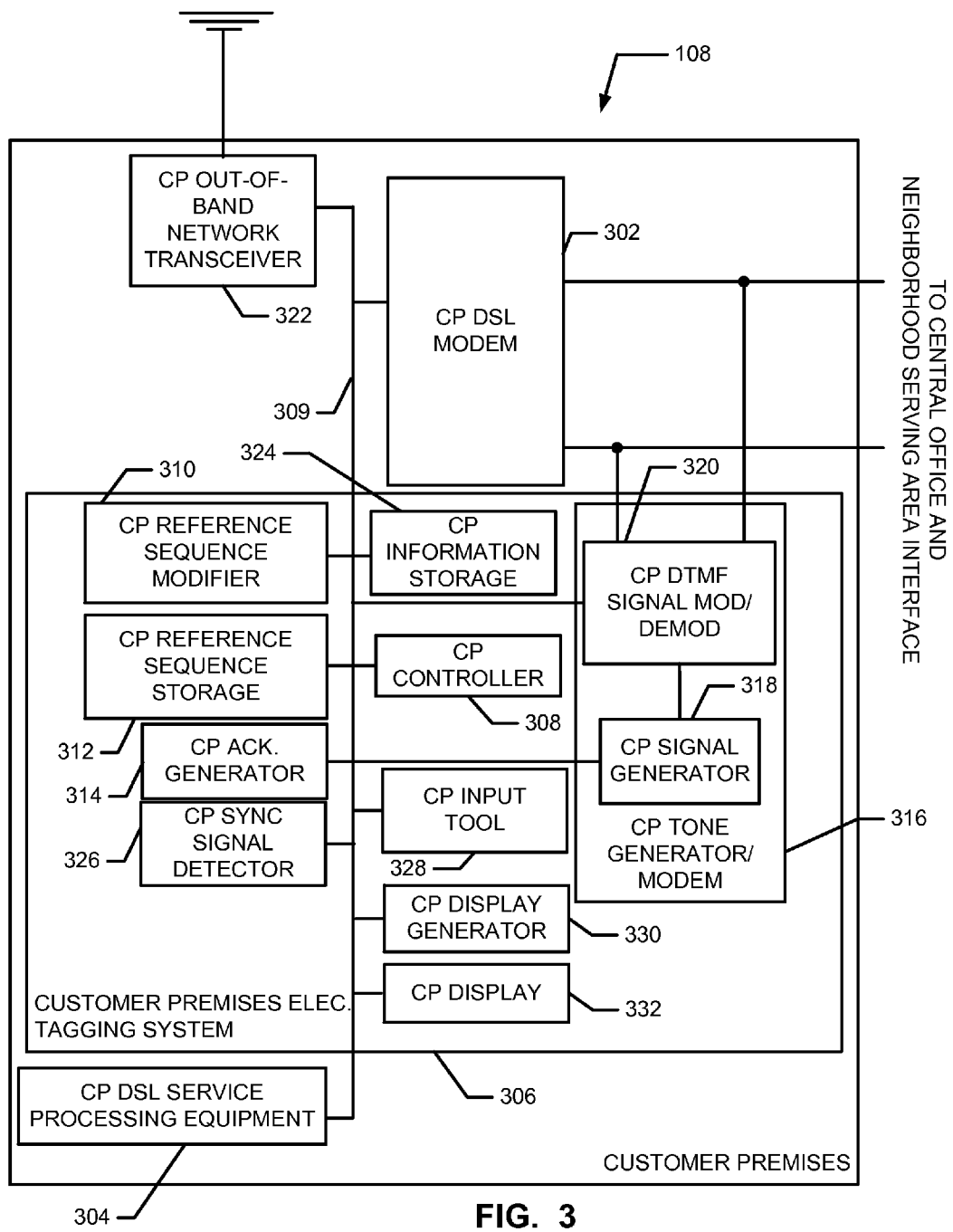
FIG. 3 is a block diagram of an example implementation of an example customer premises illustrated in FIG. 1.

FIG. 3 is a block diagram of the example customer premises 108. In the illustrated example, the DSL service supplied to the customer premises 108 via the subscriber line 106 is received at an example customer premises ("CP") modem 302 and subsequently processed at the customer premises 108 by example CP DSL service processing equipment 304. An example CP electronic tagging system 306 at the customer premises 108 includes an example CP controller 308 coupled to control an example CP reference sequence modifier 310, an example CP reference sequence storage 312, an example CP acknowledgement generator 314, an example CP tone generator 316 having an example CP signal generator 318 and an example CP DTMF signal modulator/demodulator 320. The customer premises 108 additionally includes an example CP out-of-band network transceiver 322 for communicating via an out-of-band network such as a cellular communication network.

In some examples, a reference sequence is transmitted by the central office 102 of FIG. 1 and/or FIG. 2 to the example CP DSL modem 302 and/or to the example CP out-of-band network transceiver 322. The CP DSL modem 302 and/or the CP out-of-band network transceiver 322 supplies the received reference sequence to the example CP controller 308 via communication bus 309. The CP controller 308 causes the example CP acknowledgement generator 314 to generate a receipt indicating that the reference sequence has been received. The receipt is transmitted by the CP DSL modem 302 and/or the CP out-of-band network transceiver 322 to the CO controller 202 disposed at the central office 102 (see FIG. 2).

In addition, the example CP controller 308 causes the reference sequence to be placed in the CP reference sequence storage 312. As described above, in some examples, the reference sequence includes a BAN number, a circuit ID number, a pair number, a service order number, a serial number of the tone generator/modem 206 disposed at the central office 102 (see FIG. 2) and a device ID indicating that the reference sequence was generated by the central office 102 (see FIG. 2). In addition, the CP controller 308 causes the example CP reference sequence modifier 310 to create a CP reference sequence. In some examples, the CP reference sequence is created by modifying a copy of the reference sequence received from the central office 102. In some such examples, the copy of the reference sequence is modified by replacing the modem serial number corresponding to the tone generator/modem 206 installed at the central office 102 with a modem serial number corresponding to the CP tone generator/modem 316 installed at the customer premises 108. In addition, the device ID of the reference sequence is modified to indicate that the CP reference sequence is generated by the customer premises 108. In some examples, the CP modem serial number and the CP device ID are obtained from an example CP information storage 324 and/or any other storage device installed at the customer premises 108.

In some examples, a tag command instructing the customer premises 108 to electronically tag the subscriber line 106 is also received at the example CP DSL modem 302 and/or the CP out-of-band network transceiver 322. In response to the command, which, in some examples, is transmitted by the central office 102, the example CP controller 308 causes the CP tone generator/modem 316 to electronically tag the subscriber line 106 with the CP reference sequence. In some examples, the CP signal generator 318 generates a signal that is modulated by the CP DTMF signal modulator/demodulator 320 using the CP reference sequence stored in the CP reference sequence storage 312. In some examples, the CP tone generator/modem 316 continues to electronically tag the line for a threshold amount of time and/or until a cease command is received. In some examples, the signal generated by the CP signal generator 318 and modulated by the CP signal modulator/demodulator 320 occupies an approximate frequency range of 0-10 kHz.

In some examples, a monitor command is received at the CP out-of-band network transceiver 322. In some such examples, the example CP controller 308 responds to the monitor command by causing the CP DTMF signal modulator/demodulator 320 to demodulate signals transmitted on the subscriber line 106 to decode an electronic tag received on the subscriber line 106. The reference sequence obtained from decoding the electronic tag is stored in the example CP reference sequence storage 312.

In some such examples, the example CP controller 308 causes the example CP acknowledgement generator 314 to generate an acknowledgement indicating that the electronic tag was detected and identifying the reference sequence included in the tag. The acknowledgement may be transmitted to the example central office 102, the example neighborhood serving area interface 104 and/or the example testing tool 110 via the out-of-band network transceiver 432 and/or via the subscriber line 106.

In some examples, an example CP sync signal detector 326 is configured to monitor the subscriber line 106 for a sync signal. When the sync signal is no longer detected, (e.g., when a loss of sync occurs), the CP sync signal detector 326 notifies the example CP controller 308, which automatically causes the CP tone generator/modem 316 to electronically tag the subscriber line 106.

In some examples, the field operator can use an example CP input tool 328 to manually initiate the transmission of a tag request to the NSAI electronic tagging system 408, and/or the central office electronic tagging system 200. In some such examples, the field operator, when at the customer premises 108, uses the CP input tool 328 (e.g., a keyboard, a button, a touchpad, a telephone, etc.) to cause the CP controller 308 to generate a tag command on the subscriber line 106. The CP controller 308 responds by causing the CP tone generator/modem 316 to generate a tag command on the subscriber line 106. The tag command can be implemented using any of the DTMF tones. In some examples, the tag command is implemented using one (or more) of the DTMF tones that does not correspond to any of the telephone touchpad keys (e.g., an A, B, C and/or D tone) so that a user cannot inadvertently initiate the tag command at the customer premises 108. Any and/or both of the NSAI electronic tagging system 408, and/or the central office electronic tagging system 200 respond to the tag command by placing a digital tag on the subscriber line 106 in the manner described above. In some examples, the network elements (e.g., the customer premises 108, the NSAI 104 and/or the central office 102 generate the electronic tags in a ping pong fashion. In response, the CP tone generator/modem 316 detects the electronic tag and transmits the tag to an example CP display generator 330. The CP display generator 330 subsequently supplies the tag to an example CP display 332 for display thereon. The field operator can then use the displayed information to take additional actions, as needed. In some examples, the displayed information is not in agreement with previously collected system information. For example, a modem serial number transmitted in an electronic tag by the customer premises 108 may not agree with a modem serial number previously collected by field operators when the CP DSL modem 302 was originally installed in the customer premises 108. When this occurs, the field operator can take steps needed to determine which of the serial numbers is accurate and resolve the discrepancy.

Figure 4:
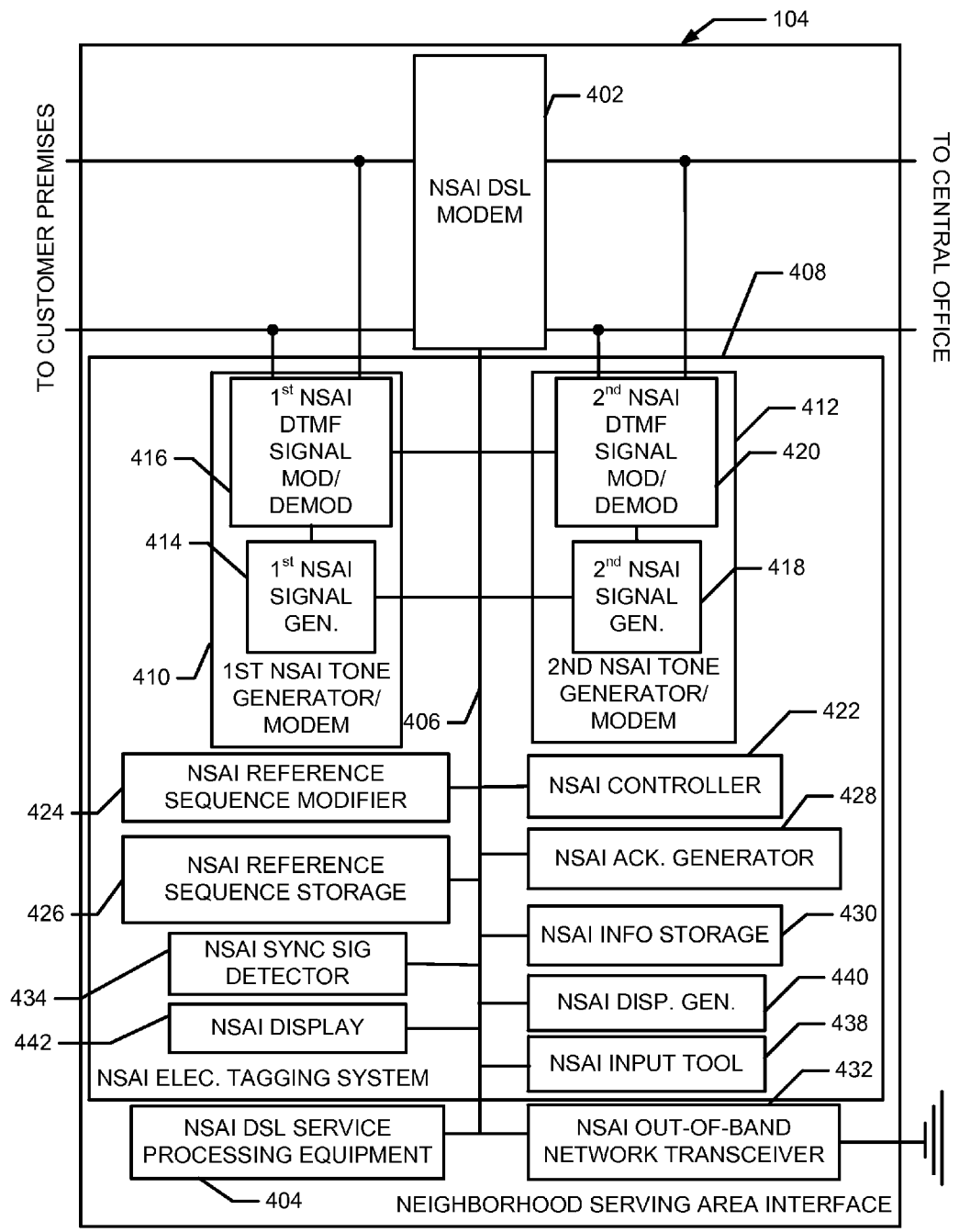
FIG. 4 is a block diagram of an example implementation of an example neighborhood serving area interface illustrated in FIG. 1.

FIG. 4 is a block diagram of the example neighborhood serving area interface 104 ("NSAI") 104 of FIG. 1. The NSAI 104 includes an NSAI DSL modem 402 coupled to the central office 102 via the subscriber line 106 and further coupled to the customer premises 108 via the subscriber line 106. In some examples, example NSAI DSL service processing equipment 404 at the NSAI 104 is coupled to the NSAI DSL modem 402 via an example NSAI communication bus 406 and performs DSL service signal processing as needed to support the provision of DSL service to the customer premises 108. The NSAI DSL modem 402 is further coupled, via the NSAI communication bus 406, to an NSAI electronic tagging system 408 having an example first NSAI tone generator/modem 410 coupled to the subscriber line 106 between the NSAI DSL modem 402 and the customer premises 108 and an example second NSAI tone generator/modem 412 coupled to the subscriber line 106 between the NSAI DSL modem 402 and the central office 102 (see FIG. 1 and FIG. 2). The first NSAI tone generator/modem 410 includes an example first NSAI signal generator 414 and an example first NSAI DTMF signal modulator/demodulator 416 and the second NSAI tone generator/modem 412 includes an example second NSAI signal generator 418 and an example second NSAI DTMF signal modulator/demodulator 420. The first and second NSAI tone generators/modems 410, 412 are configured to electronically tag the subscriber line 106 between the NSAI 104 and the central office 102 and between the NSAI 104 and the customer premises 108, respectively. In some examples, the first and second NSAI tone generators/modems 410, 412 are configured to perform the electronic tagging under the control of an example NSAI controller 422 included in the NSAI electronic tagging system 408.

The example NSAI electronic tagging system 408 further includes an example NSAI reference sequence modifier 424, an example NSAI reference sequence storage 426, an example NSAI acknowledgement generator 428, an example NSAI information storage 430 and an example NSAI out-of-band network transceiver 432, all of which are also coupled to the NSAI communication bus 406.

Although the illustrated example of FIG. 4 depicts only a single set of subscriber lines (e.g., the subscriber line 106) extending to and from the NSAI 104, in some examples, multiple subscriber lines extending from the central office 102 and/or other neighborhood serving area interface 104 are routed through the neighborhood serving area interface 104 and then distributed to respective, multiple customer premises.

In some examples, a reference sequence is transmitted by the example central office 102 of FIG. 1 and FIG. 2 to the example NSAI DSL modem 402 and/or to the example NSAI out-of-band network transceiver 432. The NSAI DSL modem 402 and/or NSAI out-of-band network transceiver 432 supplies the received reference sequence to the example NSAI controller 422 which causes the example NSAI acknowledgement generator 428 to generate a receipt indicating that the reference sequence has been received. The receipt is transmitted by the NSAI DSL modem 402 and/or the NSAI out-of-band network transceiver 432 to the CO controller 202 disposed at the central office 102 (see FIG. 2).

In addition, the example NSAI controller 422 causes the reference sequence to be placed in the example NSAI reference sequence storage 426. As described above, in some examples, the reference sequence includes a BAN number, a circuit ID number, a pair number, a service order number, a serial number of the tone generator/modem disposed at the central office 102 (see FIG. 2) and/or a device ID indicating that the reference sequence was generated by the central office 102. In addition, the NSAI controller 422 causes the example NSAI reference sequence modifier 424 to create an NSAI reference sequence. In some examples, the NSAI reference sequence is created by modifying a copy of the reference sequence received from the central office 102. In some such examples, the copy of the reference sequence is modified by replacing the modem serial number corresponding to the example CO tone generator/modem 206 installed at the central office 102 with a modem serial number corresponding to the first or second NSAI tone generator/modems 410, 412 installed at the NSAI 104. In addition, the device ID of the reference sequence is modified to indicate that the NSAI reference sequence is generated by the NSAI 104. In some examples, the NSAI modem serial number and the NSAI device ID are obtained from the example NSAI information storage 430 and/or any other storage device(s) installed at the NSAI 104. In some examples, the first and second NSAI tone generators/modems 410, 412 are implemented using a single tone generator/modem.

In some examples, a tag command instructing the example NSAI 104 to electronically tag the subscriber line 106 is also received at the example NSAI DSL modem 402 and/or the example NSAI out-of-band network transceiver 432. In response to the command, which, in some examples, is transmitted by the central office 102, the example NSAI controller 422 causes the first and second NSAI tone generator/modems 410, 412 to electronically tag the subscriber line 106 with the NSAI reference sequence. In some examples, the example first and second NSAI signal generators 414, 418 generate signals within or near the frequency range of 0-10 kHz that are then modulated by the first and second NSAI DTMF signal modulators/demodulators 416, 420, respectively, both using the NSAI reference sequence stored in the NSAI reference sequence storage 426. In some examples, the first and second NSAI tone generator/modems 410, 412 continue to electronically tag the line for a threshold amount of time and/or until a cease command is received.

In some examples, a monitor command is received at the NSAI out-of-band network transceiver 432. In some such examples, the example NSAI controller 422 responds to the monitor command by causing the first and/or the second NSAI DTMF signal modulators/demodulators 416, 420 to demodulate signals transmitted on the subscriber line 106 and thereby decode an electronic tag received on the subscriber line 106. In some examples, the CO reference sequence is detected and in some examples the CP reference signal is detected. The reference sequence(s) obtained from decoding the electronic tag(s) is stored in the example NSAI reference sequence storage 426.

In some such examples, the NSAI controller 422 causes the example NSAI acknowledgement generator 428 to generate an acknowledgement indicating that the electronic tag was detected and identifying the reference sequence included in the tag. The acknowledgement may be transmitted to the central office 102, the customer premises 108 and/or the testing tool 110 via the NSIA out-of-band network transceiver 432 and/or via the subscriber line 106. In some examples, the NSAI electronic tagging system 408 further includes an example NSAI sync signal detector 434. When the sync signal detector 434 determines that a loss of sync has occurred, the sync signal detector 434 notifies the example NSAI controller 422 which causes the first NSAI tone generator/modem 410 and the second NSAI tone generator/modem 412 to begin electronically tagging the subscriber line 106.

In some examples, the field operator can use an example NSAI input tool 438 to manually initiate the transmission of a tag request to the CP electronic tagging system 306, and/or the central office electronic tagging system 200. In some such examples, the field operator, when at the customer premises 104, uses the CP input tool 438 (e.g., a keyboard, a button, a touchpad, a telephone, etc.) to cause the NSAI controller 422 to generate a tag command on the subscriber line 106. The NSAI controller 422 responds by causing the first NSAI tone generator/modem 410 and/or the second NSAI tone generator/modem 412 to generate a tag command on the subscriber line 106. The tag command can be implemented using any of the DTMF tones. In some examples, the tag command is implemented using one (or more) of the DTMF tones that does not correspond to any of the telephone touchpad keys (e.g., an A, B, C and/or D tone) so that a user cannot inadvertently initiate the tag command at the customer premises 108. Any and/or both of the CP electronic tagging system 306, and/or the central office electronic tagging system 200 respond to the tag command by placing a digital tag on the subscriber line 106 in the manner described above. In response, the first NSAI tone generator/modem 410 and/or the second NSAI tone generator/modem 412 detects the electronic tag and transmits the tag to an example NSAI display generator 440. The NSAI display generator 440 subsequently supplies the tag to an example NSAI display 442 for display thereon. The field operator can then use the displayed information to take additional actions, as needed.

Figure 5:
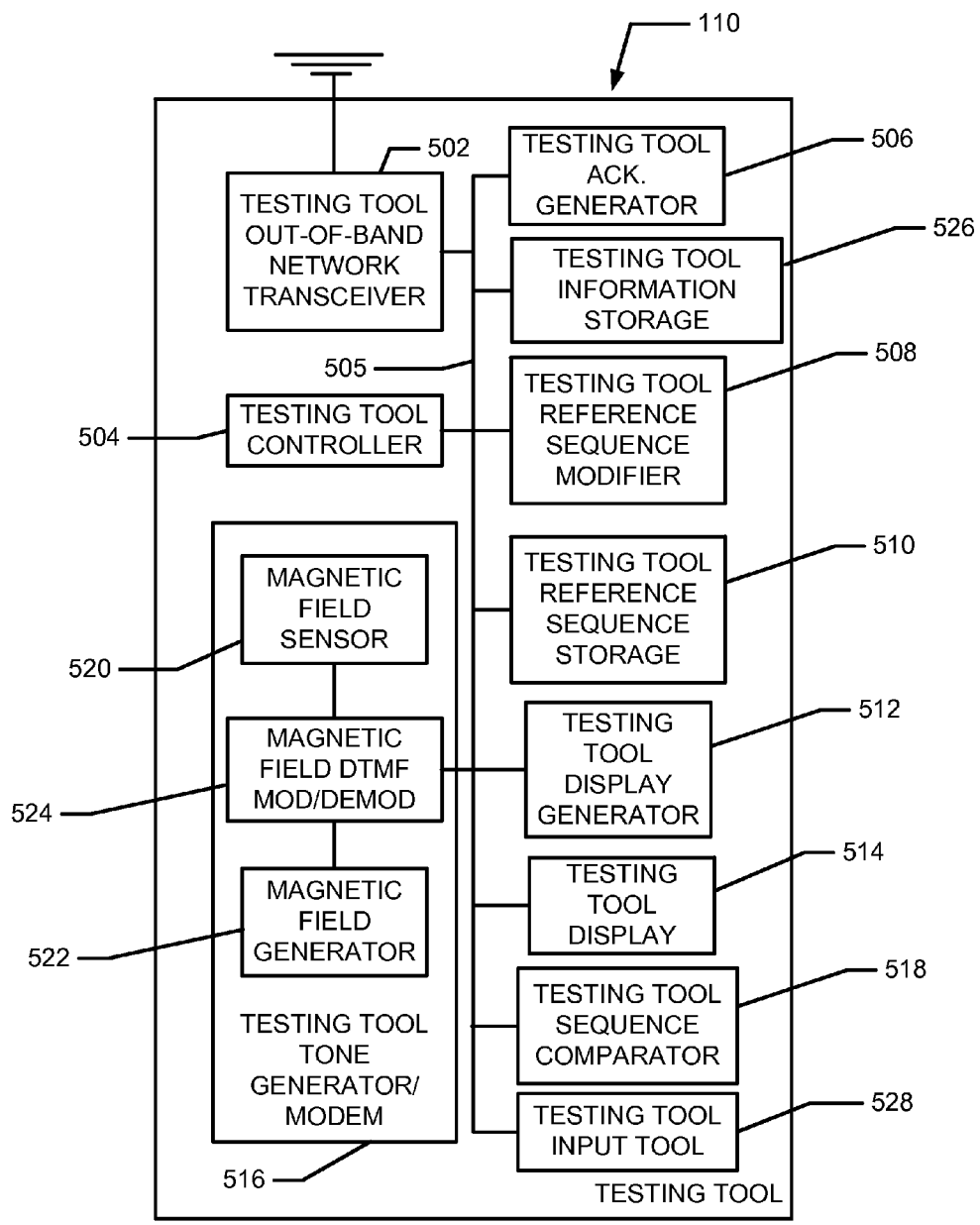
FIG. 5 is a block diagram of an example implementation of an example portable circuit probe/testing tool illustrated in FIG. 1.

FIG. 5 is a block diagram of the example testing tool 110 of FIG. 1. In the illustrated example, the testing tool 110 includes an example testing tool out-of band network transceiver 502 by which the testing tool 110 communicates with the example central office 102, the example customer premises 108 and/or the example NSAI 104. In some examples, the testing tool 110 additionally includes an example testing tool controller 504, coupled via an example communication bus 505 to an example testing tool acknowledgement generator 506, an example testing tool reference sequence modifier 508, an example testing tool sequence storage 510, an example testing tool display generator 512, an example testing tool display screen 514, an example testing tool tone generator/modem 516, and an example testing tool sequence comparator 518. The testing tool tone generator/modem 516 includes an example testing tool magnetic field sensor 520, an example testing tool magnetic field generator 522 and an example magnetic field DTMF signal modulator/demodulator 524.

In an example operation, a reference sequence corresponding to the subscriber line 106 is received at the example testing tool out-of-band network transceiver 502. The example testing tool controller 504 causes the reference sequence to be stored in the testing tool reference sequence storage 510 and causes the example testing tool acknowledgement generator 506 to generate an acknowledgement indicating that the reference sequence has been received. The example testing tool out-of-band network transceiver 502 transmits the acknowledgement to the example central office 102, the example customer premises 108 and/or the example NSAI 104. In response to receiving the reference sequence, the testing tool controller 504 also causes the example testing tool reference sequence modifier 508 to modify a copy of the received reference sequence and thereby create a testing tool reference sequence. In some examples, the testing tool reference sequence modifier 508 changes the modem serial number included in the reference sequence to reflect a serial number associated with the testing tool 110. In addition, the testing tool reference sequence modifier 508 changes a device ID included in the reference sequence to identify the testing tool 110 as the device responsible for generating the testing tool reference sequence. In some examples, the testing tool device ID and the testing tool serial number can be stored in an example testing tool information storage 528 for access by the testing tool reference sequence modifier 508. After the modifications, the testing tool reference sequence modifier 508 stores the testing tool reference sequence in the testing tool reference sequence storage 510.

In addition to receiving the reference sequence from the example central office 102, the testing tool 110 also receives a notification via the example testing tool out-of-band network transceiver 502 indicating that the central office 102, the customer premises 108, and/or the NSAI 104 has electronically tagged the example subscriber line 106. Upon receiving the notification indicating that the subscriber line 106 has been electronically tagged, the example testing tool controller 504 causes the example testing tool display generator 512 to generate a message for display at the example testing tool display screen 514. The message indicates to a field operator using the testing tool 110 that the subscriber line of interest (e.g., the subscriber line 106) has been electronically tagged.

In response to the displayed message, the field operator attempts to identify which of a set of subscriber lines is the subscriber line 106 of interest. In some examples, the field operator makes the identification attempt by placing the testing tool 110 within a threshold proximity of a first wire included in the set of wires. When placed at the threshold proximity, the example testing tool magnetic field sensor 520 senses the magnetic field induced around the individual wire as a result of the well-known phenomenon referred to as the Hall Effect. The sensed magnetic field is supplied by the testing tool magnetic field sensor 520 to the example magnetic field DTMF signal modulator/demodulator 524 which demodulates any DTMF tones (e.g., the electronic tag) being transmitted on the wire to produce a detected reference sequence. The testing tool controller 504 causes the testing tool sequence comparator 518 to compare the detected reference sequence to the reference sequence previously received via the example testing tool out-of-band network transceiver 502. If the detected reference sequence (e.g., the electronic tag) matches the received reference sequence, then the wire currently being tested is identified as the subscriber line of interest and the field operator proceeds to make any repairs needed to the subscriber line of interest and/or disconnect the subscriber line of interest as needed to replace/repair equipment coupled to the subscriber line of interest. In some examples, the testing tool controller 504 causes the example acknowledgement generator 506 to generate a message indicating that the electronic tag has been detected and the message is transmitted (via the out-of-band transceiver 502, to any of the example central office 102, the example customer premises 108, and/or the example NSAI 104.

If, instead, no reference sequence is detected or the detected reference sequence does not match the received reference sequence corresponding to the subscriber line, then the wire currently being tested is identified as not being the subscriber line of interest. As a result, the example testing tool controller 504 causes the example display generator 512 to generate a message indicating that the subscriber line 106 currently under test is not the subscriber line of interest and the message is displayed at the example testing tool display screen 514. The field operator then selects a next wire to be tested and repeats the procedure until all of the wires have been tested and/or a wire having the electronic tag is detected. In some examples, the testing tool display generator 512 causes the detected reference sequence to be displayed and the field operator compares the displayed, detected reference sequence to the expected reference sequence to determine whether the subscriber line being tested is the subscriber line of interest.

In some examples, the field operator can use an example testing tool input tool 528 to manually initiate the transmission of a tag request to the customer premises electronic tagging system 306, the NSAI electronic tagging system 408, and/or the central office electronic tagging system 200. In some such examples, the field operator identifies a wire to be identified and then uses the testing tool input tool 528 (e.g., a keyboard, a button, a touchpad, etc.) to cause the testing tool controller 504 to generate a tag command on the wire. The testing tool controller 504 responds by causing the testing tool tone generator/modem 516 to generate a tag command on the subscriber line 106. The tag command can be implemented using any of the DTMF tones. In some examples, the tag command is implemented using one (or more) of the DTMF tones that does not correspond to any of the telephone touchpad keys (e.g., an A, B, C and/or D tone) so that a user cannot inadvertently initiate the tag command at the customer premises 108. Any and/or all of the customer premises electronic tagging system 306, the NSAI electronic tagging system 408, and/or the central office electronic tagging system 200 respond to the tag command by placing a digital tag on the wire in the manner described above. In response, the testing tool tone generator/modem 516 detects the electronic tag and transmits the tag to the example testing tool display generator 512. The testing tool display generator 512 subsequently supplies the tag to the example testing tool display 514 for display thereon. The field operator can then use the displayed information to identify the wire and take additional actions, as needed.

While example manners of implementing the example central office 102, the example central office electronic tagging system 200, the example customer premises 108, the example customer premises electronic tagging system 306, the example NSAI 104, the example NSAI electronic tagging system 408, and the example testing tool 110 of FIG. 1 have been illustrated in FIG. 2, FIG. 3, FIG. 4, and FIG. 5, one or more of the elements, processes and/or devices illustrated in the FIG. 2, FIG. 3, FIG. 4, and FIG. 5 can be combined, divided, re-arranged, omitted, eliminated and/or implemented in any other way. Further, any of the example CO controller 202, the example communication bus 204, the example CO tone generator/modem 206, the example CO DTMF signal modulator/demodulator 208, the example CO signal generator 210, the example CO reference sequence generator 212, the example CO reference sequence storage 214, the example CO command generator 216, the example CO DSL modem 218, the example CO data input tool 220, the example CO service database 222, the example CO out-of-band network transceiver 224, the example CO display generator 226, the example CO display 228, the example CO DSL service equipment 230, the example timer 232, the example CP DSL modem 302, the example CP DSL service processing equipment 304, the example CP controller 308, the example CP communication bus 309, the example CP reference sequence modifier 310, the example CP reference sequence storage 312, the example CP acknowledgement generator 314, the example CP tone generator/modem 316, the example CP signal generator 318, the example CP DTMF signal modulator/demodulator 320, the example CP out-of-band network transceiver 322, the example CP information storage 324, the example CP sync signal detector 326, the example CP input tool 328, the example CP display generator 330, the example CP display 332, the example NSAI DSL modem 402, the example NSAI DSL service processing equipment 404, the example communication bus 406, the example first NSAI tone generator/modem 410, the example second NSAI tone generator/modem 412, the example first NSAI signal generator 414, the example first NSAI DTMF signal modulator/demodulator 416, the example second NSAI signal generator 418, the example second NSAI DTMF signal modulator/demodulator 420, the example NSAI controller 422, the example NSAI reference sequence modifier 424, the example NSAI reference sequence storage 426, the example NSAI acknowledgement generator 428, the example NSAI information storage 430, the example NSAI out-of-band network transceiver 432, the example NSAI sync signal detector 434, the example NSAI input tool 438, the example NSAI display generator 440, the example NSAI display 442, the example testing tool out-of-band network transceiver 502, the example testing tool controller 504, the example testing tool communication bus 505, the example testing tool acknowledgement generator 506, the example testing tool reference sequence modifier 508, the example testing tool reference sequence storage 510, the example testing tool display generator 512, the example testing tool display 514, the example testing tool tone generator/modem 516, the example testing tool sequence comparator 518, the example testing tool magnetic field sensor 520, the example testing tool magnetic field generator 522, the example magnetic field DTMF signal modulator/demodulator 524, the example testing tool information storage 526, the example testing tool input tool 528, and/or, more generally, the example central office electronic tagging system 200, the example customer premises electronic tagging system 306, the example NSAI electronic tagging system 408, and the example testing tool 110 may be implemented by hardware, software, firmware and/or any combination of hardware, software and/or firmware. Thus, for example, any of the example CO controller 202, the example communication bus 204, the example CO tone generator/modem 206, the example CO DTMF signal modulator/demodulator 208, the example CO signal generator 210, the example CO reference sequence generator 212, the example CO reference sequence storage 214, the example CO command generator 216, the example CO DSL modem 218, the example CO data input tool 220, the example CO service database 222, the example CO out-of-band network transceiver 224, the example CO display generator 226, the example CO display 228, the example CO DSL service equipment 230, the example timer 232, the example CP DSL modem 302, the example CP DSL service processing equipment 304, the example CP controller 308, the example CP communication bus 309, the example CP reference sequence modifier 310, the example CP reference sequence storage 312, the example CP acknowledgement generator 314, the example CP tone generator/modem 316, the example CP signal generator 318, the example CP DTMF signal modulator/demodulator 320, the example CP out-of-band network transceiver 322, the example CP information storage 324, the example CP sync signal detector 326, the example CP input tool 328, the example CP display generator 330, the example CP display 332, the example NSAI DSL modem 402, the example NSAI DSL service processing equipment 404, the example communication bus 406, the example first NSAI tone generator/modem 410, the example second NSAI tone generator/modem 412, the example first NSAI signal generator 414, the example first NSAI DTMF signal modulator/demodulator 416, the example second NSAI signal generator 418, the example second NSAI DTMF signal modulator/demodulator 420, the example NSAI controller 422, the example NSAI reference sequence modifier 424, the example NSAI reference sequence storage 426, the example NSAI acknowledgement generator 428, the example NSAI information storage 430, the example NSAI out-of-band network transceiver 432, the example NSAI sync signal detector 434, the example NSAI input tool 438, the example NSAI display generator 440, the example NSAI display 442, the example testing tool out-of-band network transceiver 502, the example testing tool controller 504, the example testing tool communication bus 505, the example testing tool acknowledgement generator 506, the example testing tool reference sequence modifier 508, the example testing tool reference sequence storage 510, the example testing tool display generator 512, the example testing tool display 514, the example testing tool tone generator/modem 516, the example testing tool sequence comparator 518, the example testing tool magnetic field sensor 520, the example testing tool magnetic field generator 522, the example magnetic field DTMF signal modulator/demodulator 524, the example testing tool information storage 526, the example testing tool input tool 528, and/or, more generally, the example central office electronic tagging system 200, the example customer premises electronic tagging system 306, the example NSAI electronic tagging system 408, and the example testing tool 110 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example CO controller 202, the example communication bus 204, the example CO tone generator/modem 206, the example CO DTMF signal modulator/demodulator 208, the example CO signal generator 210, the example CO reference sequence generator 212, the example CO reference sequence storage 214, the example CO command generator 216, the example CO DSL modem 218, the example CO data input tool 220, the example CO service database 222, the example CO out-of-band network transceiver 224, the example CO display generator 226, the example CO display 228, the example CO DSL service equipment 230, the example timer 232, the example CP DSL modem 302, the example CP DSL service processing equipment 304, the example CP controller 308, the example CP communication bus 309, the example CP reference sequence modifier 310, the example CP reference sequence storage 312, the example CP acknowledgement generator 314, the example CP tone generator/modem 316, the example CP signal generator 318, the example CP DTMF signal modulator/demodulator 320, the example CP out-of-band network transceiver 322, the example CP information storage 324, the example CP sync signal detector 326, the example CP input tool 328, the example CP display generator 330, the example CP display 332, the example NSAI DSL modem 402, the example NSAI DSL service processing equipment 404, the example communication bus 406, the example first NSAI tone generator/modem 410, the example second NSAI tone generator/modem 412, the example first NSAI signal generator 414, the example first NSAI DTMF signal modulator/demodulator 416, the example second NSAI signal generator 418, the example second NSAI DTMF signal modulator/demodulator 420, the example NSAI controller 422, the example NSAI reference sequence modifier 424, the example NSAI reference sequence storage 426, the example NSAI acknowledgement generator 428, the example NSAI information storage 430, the example NSAI out-of-band network transceiver 432, the example NSAI sync signal detector 434, the example NSAI input tool 438, the example NSAI display generator 440, the example NSAI display 442, the example testing tool out-of-band network transceiver 502, the example testing tool controller 504, the example testing tool communication bus 505, the example testing tool acknowledgement generator 506, the example testing tool reference sequence modifier 508, the example testing tool reference sequence storage 510, the example testing tool display generator 512, the example testing tool display 514, the example testing tool tone generator/modem 516, the example testing tool sequence comparator 518, the example testing tool magnetic field sensor 520, the example testing tool magnetic field generator 522, the example magnetic field DTMF signal modulator/demodulator 524, the example testing tool information storage 526, the example testing tool input tool 528 is/are hereby expressly defined to include a tangible computer readable storage device or storage disk such as a memory, a digital versatile disk (DVD), a compact disk (CD), a Blu-ray disk, etc. storing the software and/or firmware. Further still, the example central office 102, the example NSAI 104, the example customer premises 108 and the example testing tool 110 of FIG. 1, FIG. 2, FIG. 3, FIG. 4, and FIG. 5 may include one or more elements, processes and/or devices in addition to, or instead of, those illustrated in FIG. 1, FIG. 2, FIG. 3, FIG. 4, and FIG. 5 and/or may include more than one of any or all of the illustrated elements, processes and devices.

Figure 6:
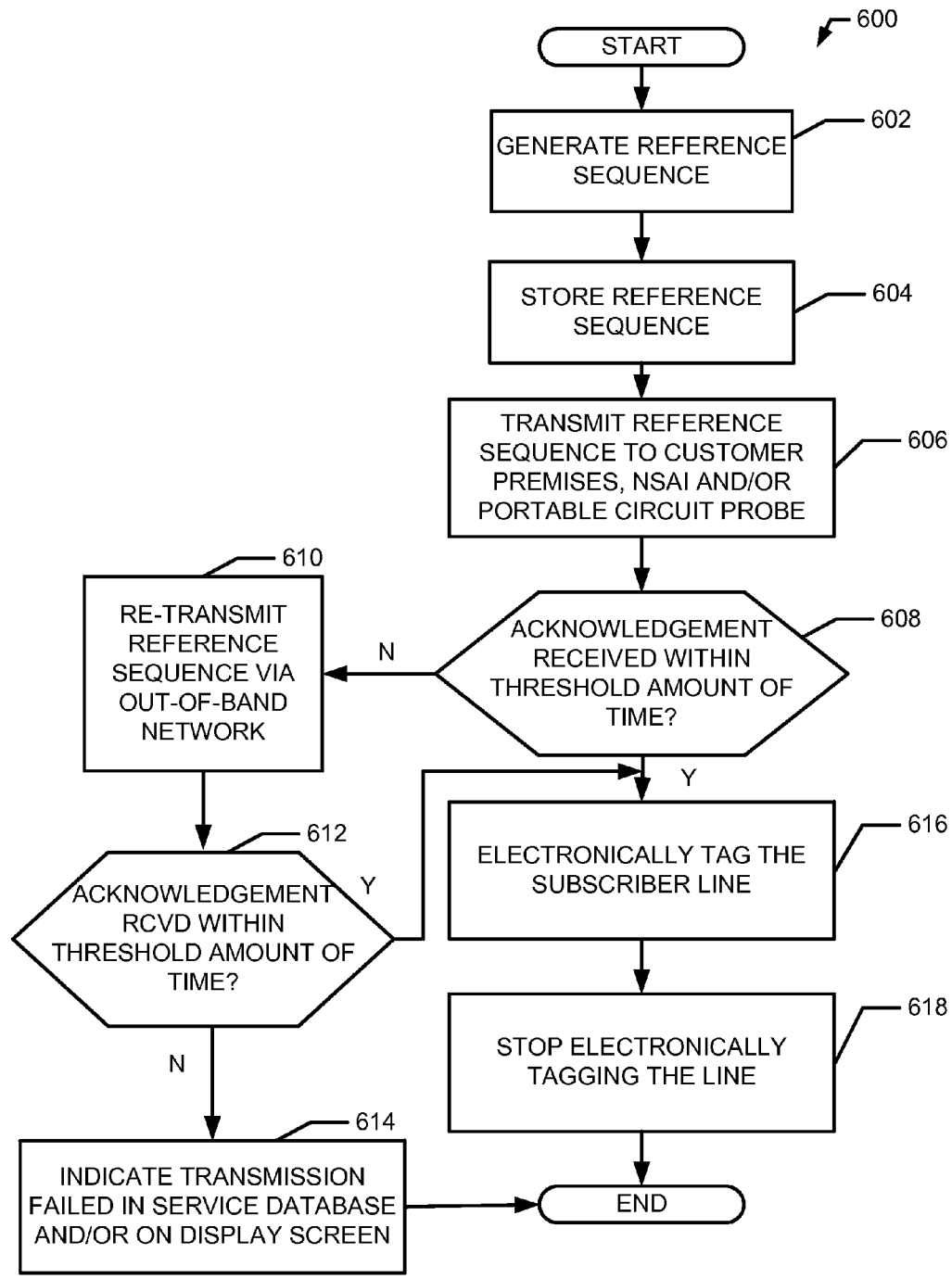
FIG. 6 is a flowchart representative of first example computer readable instructions that can be executed by the example central office of FIG. 1 and/or FIG. 2.
Figure 7:
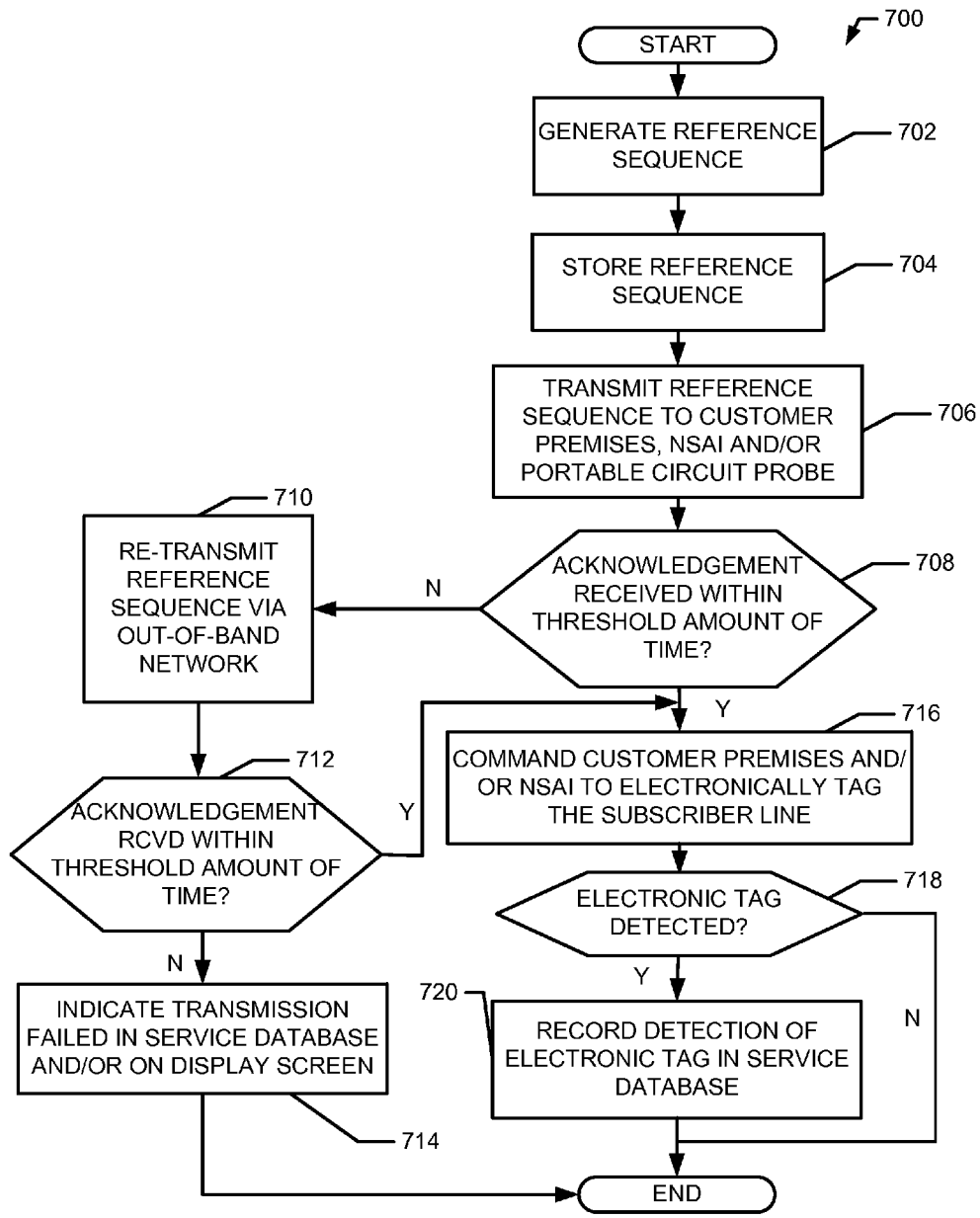
FIG. 7 is a flowchart representative of second example computer readable instructions that can be executed by the example central office of FIG. 1 and/or FIG. 2.
Figure 8:
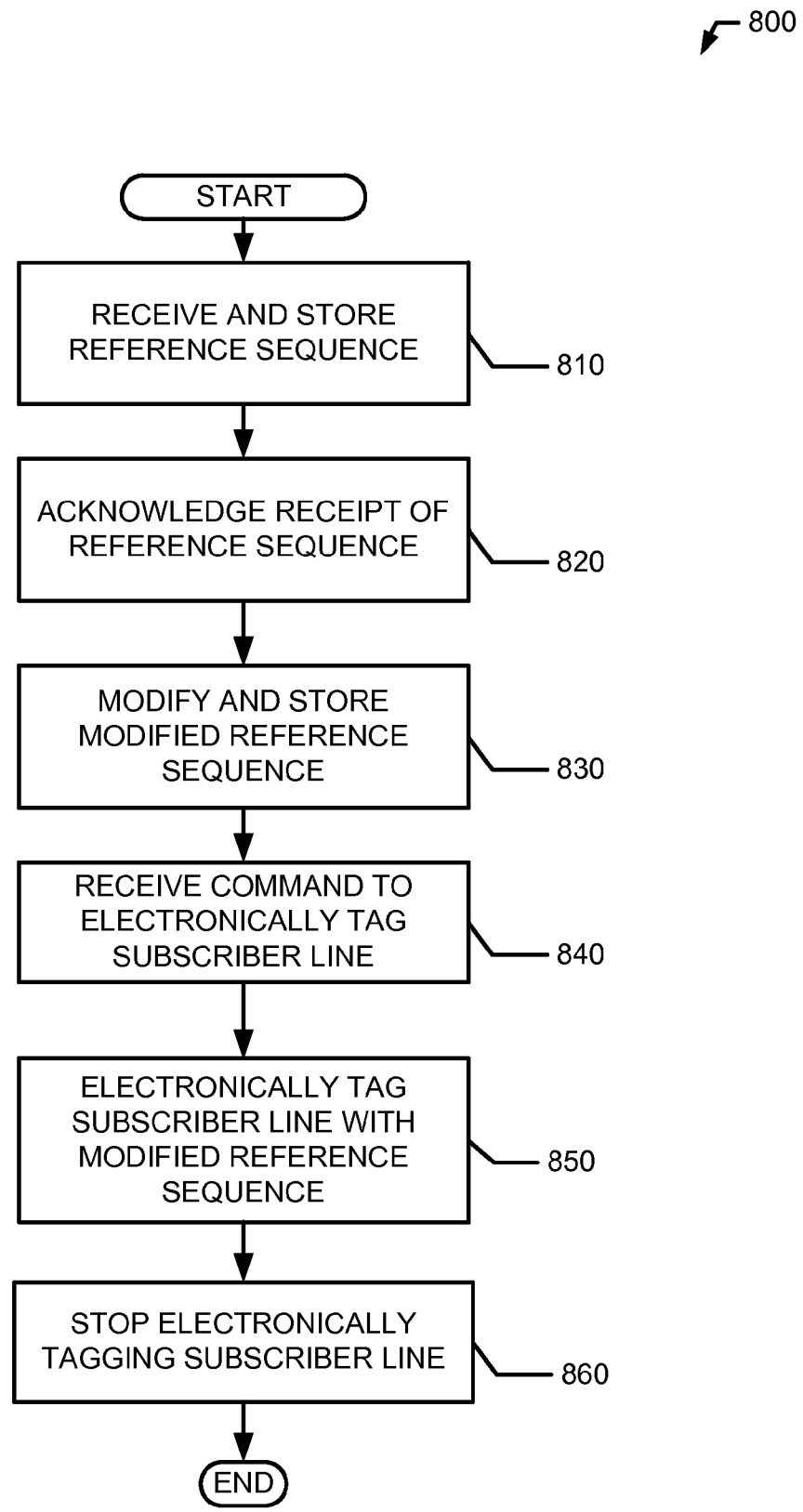
FIG. 8 is a flowchart representative of first example computer readable instructions that can be executed by the example customer premises of FIG. 1 and/or FIG. 3.
Figure 9:
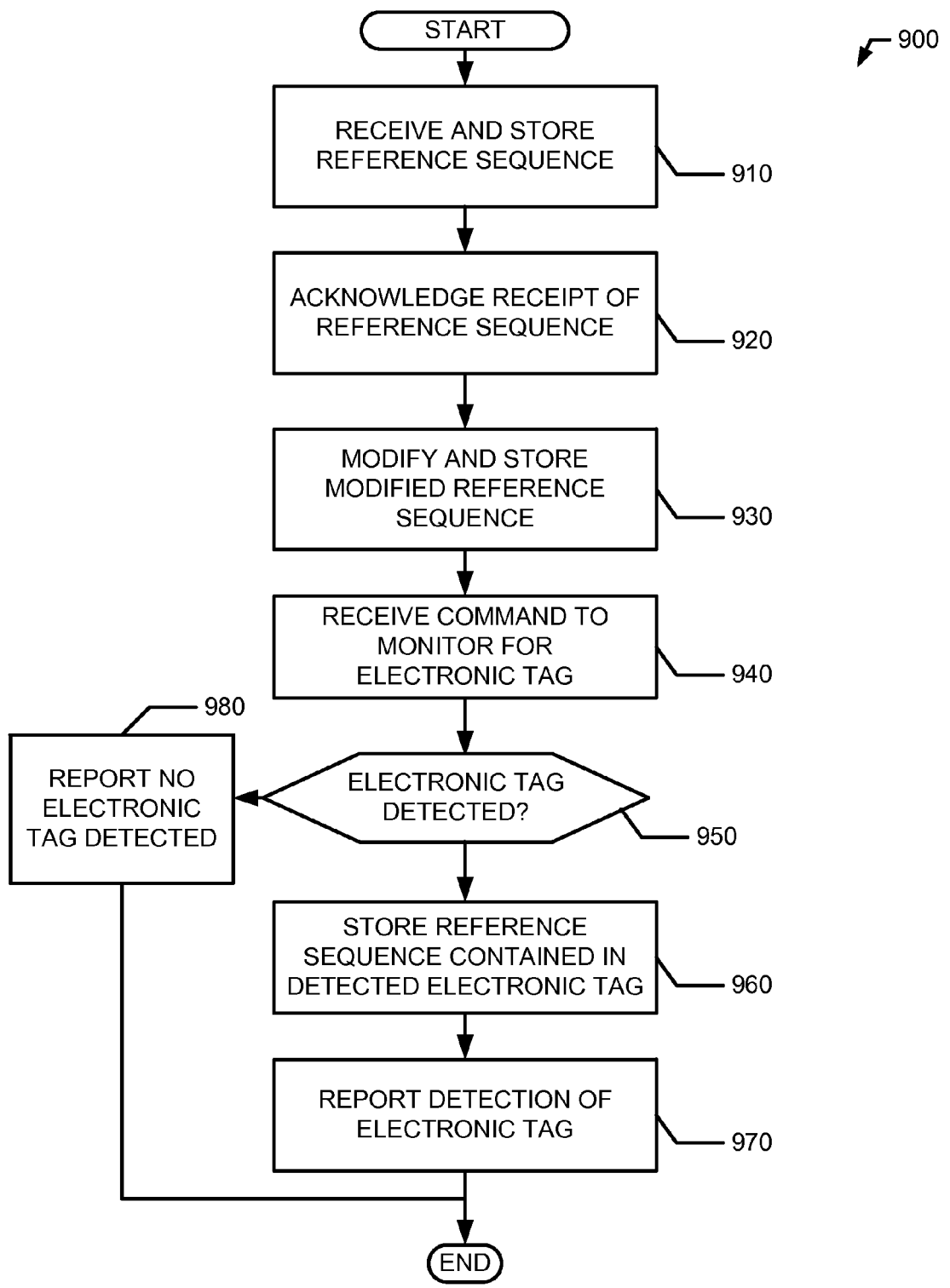
FIG. 9 is a flowchart representative of second example computer readable instructions that can be executed by the example customer premises of FIG. 1 and/or FIG. 3.
Figure 10:
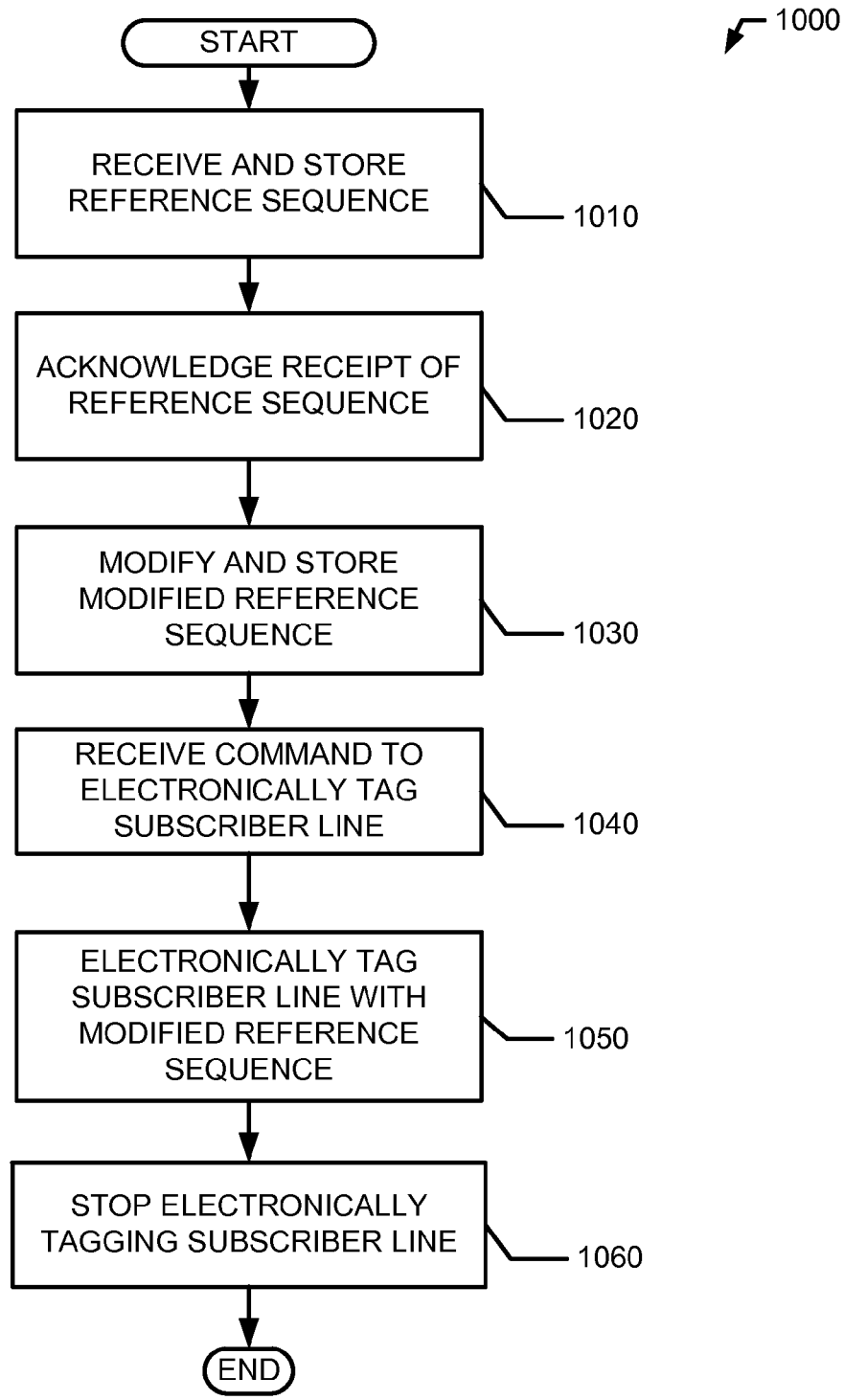
FIG. 10 is a flowchart representative of first example computer readable instructions that can be executed by the example neighborhood serving area interface of FIG. 1 and/or FIG. 4.
Figure 11:
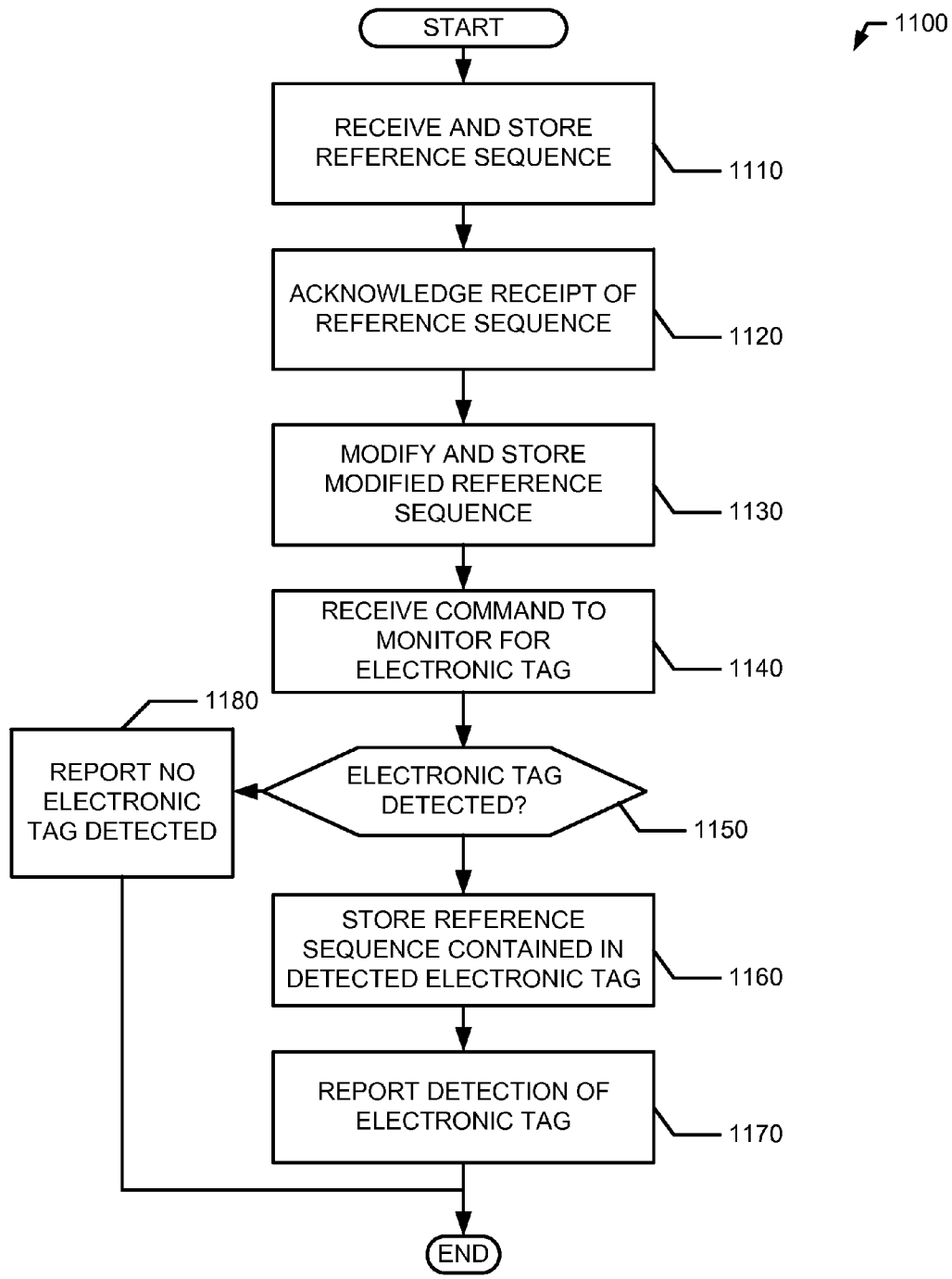
FIG. 11 is a flowchart representative of second example computer readable instructions that can be executed by the example neighborhood serving area interface of FIG. 1 and/or FIG. 4.
Figure 12:
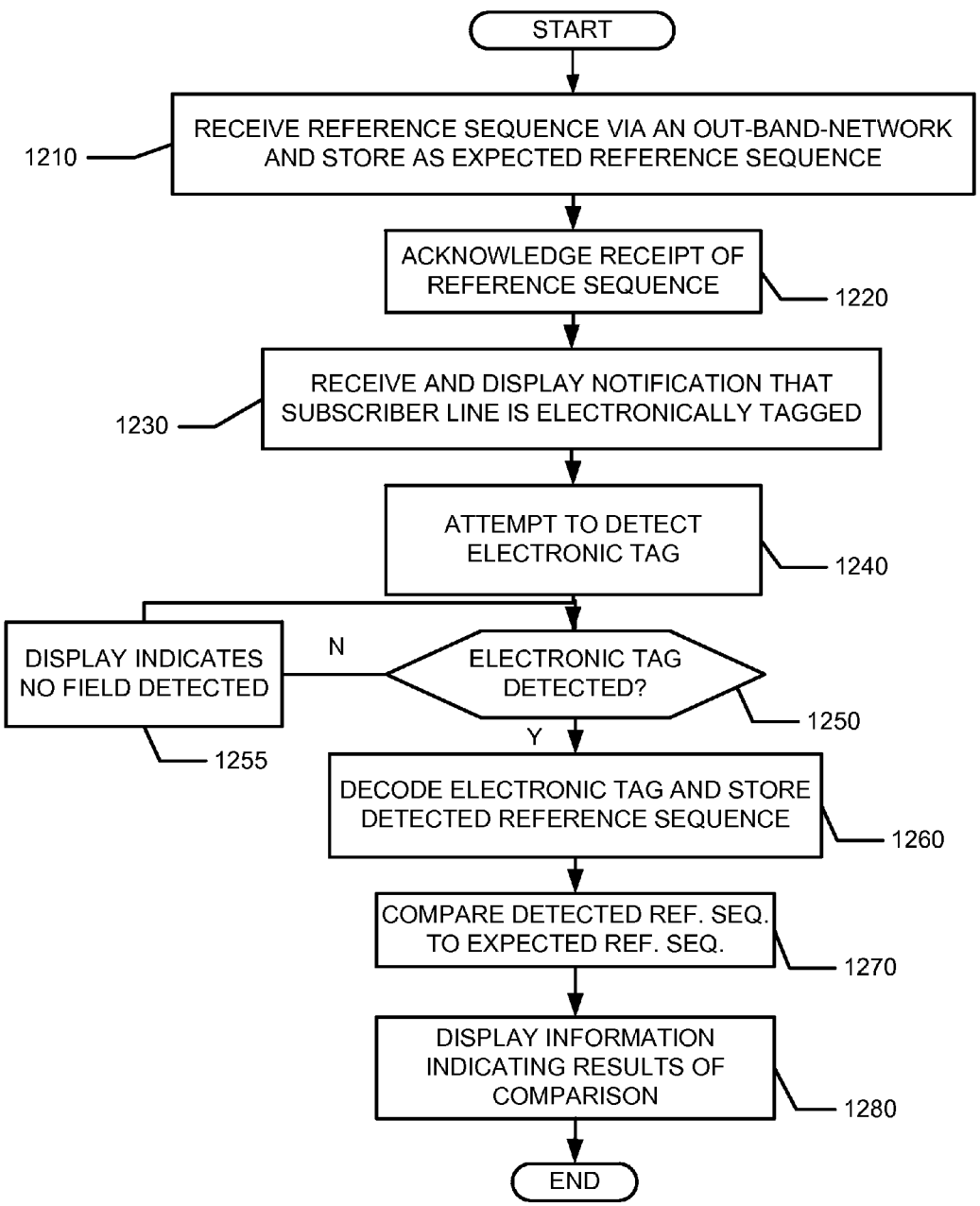
FIG. 12 is a flowchart representative of example computer readable instructions that can be executed by the example testing tool of FIG. 1 and/or FIG. 5.

Flowcharts representative of example machine readable instructions for implementing the example central office 102 and central office electronic tagging system 200 of FIG. 1 and FIG. 2 are shown in FIG. 6 and FIG. 7. Flowcharts representative of example machine readable instructions for implementing the example customer premises 108 and CP electronic tagging system 306 of FIG. 1 and FIG. 3 are shown in FIG. 8 and FIG. 9. Flowcharts representative of example machine readable instructions for implementing the example NSAI 104, and the NSAI electronic tagging system 408 of FIG. 1 and FIG. 4 are shown in FIG. 10 and FIG. 11. Flowcharts representative of example machine readable instructions for implementing the example testing tool 110 of FIG. 1 and FIG. 5 are shown in FIG. 12. In these examples, the machine readable instructions comprise a program for execution by a processor such as the processor 1312 shown in the example processor platform 1300 discussed below in connection with FIG. 13, the processor 1412 shown in the example processor platform 1400 discussed below in connection with FIG. 14, the processor 1512 shown in the example processor platform 1500 discussed below in connection with FIG. 15, and/or the processor 1612 shown in the example processor platform 1600 discussed below in connection with FIG. 16. The program may be embodied in software stored on a tangible computer readable storage medium such as a CD-ROM, a floppy disk, a hard drive, a digital versatile disk (DVD), a Blu-ray disk, or a memory associated with the processor 1312, the processor 1412, the processor 1512, and/or the processor 1612 but the entire program and/or parts thereof could alternatively be executed by a device other than the processor 1312, the processor 1412, the processor 1512 and/or the processor 1612 and/or embodied in firmware or dedicated hardware. Further, although the example programs are described with reference to the flowcharts illustrated in FIGS. 6, 7, 8, 9, 10, 11 and 12, many other methods of implementing the example central office 102, the example CO electronic tagging system 200, the example customer premises 108, the example CP electronic tagging system 306, the NSAI 104, the example NSAI electronic tagging system 408, and the example testing tool 110 may alternatively be used. For example, the order of execution of the blocks may be changed, and/or some of the blocks described may be changed, eliminated, or combined.

As mentioned above, the example processes of FIGS. 6, 7, 8, 9, 10, 11, and 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6, 7, 8, 9, 10, 11, and 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

First example machine readable instructions 600 that may be executed to implement the example central office 102 and the example CO electronic tagging system 200 of FIGS. 1 and 2 are represented by the flowchart shown in FIG. 6. The example machine readable instructions 600 may be executed periodically and/or aperiodically (e.g., at predetermined intervals, based on an occurrence of a predetermined event, etc., or any combination thereof). The machine readable instructions 600 begin execution at a block 602 of FIG. 6 at which the CO reference sequence generator 212 (see FIG. 2) generates a reference sequence for the subscriber line 106 (see FIG. 1). In some examples, the reference sequence generator 212 generates a reference sequence in response to an entry in the example service database 222 (see FIG. 2). The entry in the service database 222 may indicate that DSL service supplied to the customer premises 108 via the subscriber line 106 has been interrupted such that a service order has been placed. In some examples, the entry in the service database 222 may be performed in preparation of a possible future interruption of DSL service to the customer premises 108. In some examples, the example CO controller 202 may determine that service has been interrupted on the subscriber line 106 and thereafter cause the reference sequence generator to generate the reference sequence.

The CO reference sequence generator 212 stores the reference sequence in the CO reference sequence storage 214 (block 604). In some examples, the reference sequence is stored with information indicating that the reference sequence is generated at the central office 102. During an initialization phase, the CO DSL modem 218 transmits the reference sequence via the subscriber line 106 to the customer premises 108, the NSAI 104, and/or the testing tool 110 (block 606). If the CO controller 202 determines an acknowledgement is not received from the customer premises 108, the NSAI 104, and/or the testing tool 110 within a threshold amount of time as measured by the example timer 232 (block 608), the CO out-of-band network transceiver 224 transmits the reference sequence to the customer premises 108, the NSAI 104 and/or the testing tool 110 via an out-of-band network (block 610). In some examples, the CO controller 202 then determines whether an acknowledgement of the reference sequence is received from the recipients of the reference sequence within a threshold amount of time (block 612). If an acknowledgement is not forthcoming, the CO controller 202 indicates that the attempt to transmit the reference sequence was unsuccessful in the example service database 222 and/or causes the CO display generator 226 to display a message at the CO display 228 indicating the attempt was unsuccessful (block 614) and the method ends.

If an acknowledgement is received within a threshold amount of time as determined by the CO controller 202 (block 608), at some time later when the line tagging is to occur (e.g., when a sync signal is no longer detected by the CO controller 202 or service issue is reported by a customer) the CO controller 202 causes the CO tone generator/modem 206 to electronically tag the subscriber line 106 with the reference sequence (block 616). In some examples, the CO signal generator 210 generates a signal that is modulated by the CO DTMF signal modulator/demodulator 208 with the reference sequence to electronically tag to the subscriber line 106.

In some examples, after a threshold amount of time, the controller causes the CO tone generator/modem 206 to stop electronically tagging the line (block 618) and the method ends. In some examples, the controller causes the CO tone generator/modem 206 to stop electronically tagging the line in response to a notice received via the DSL modem and/or the out-of-band network transceiver indicating that one or more of the customer premises 108, the NSAI 104 or the testing tool 110 successfully detected the electronic tag (e.g., with or separate from the first example instructions 600). In some such examples, the controller may enter information into the example service database 222 indicating that the electronic tag was successfully detected at the customer premises 108, the NSAI 104 and/or the testing tool 110, as appropriate.

In some examples, more than a single bonded pair of circuits (e.g., "n" bonded pairs) form the subscriber line 106. In some such examples, the central office 102 will have information stored (e.g., in the service database 222) identifying the "n" bonded pairs that form the subscriber line 106. Additionally, when the subscriber line 106 is being tested, the central office controller 202 will determine whether an electronic tag has been detected on each of the "n" bonded pairs. If any of the "n" number of pairs is not responding the CO controller 202 will proactively indicate in the service database 222 and/or on the CO display 228 that a degraded service is detected on that subscriber line 106. Additionally, the CO controller 202 can provide information identifying the physical line (e.g., the circuit pair) at issue so that further tests and/or needed repairs can be taken.

Second example machine readable instructions 700 that may be executed (e.g., with or separately from the first example instructions 600) to implement the example central office 102 and the example CO electronic tagging system 200 of FIGS. 1 and 2 are represented by the flowchart shown in FIG. 7. The example machine readable instructions 700 may be executed periodically and/or aperiodically (e.g., at predetermined intervals, based on an occurrence of a predetermined event, etc., or any combination thereof). The machine readable instructions 700 begin execution at a block 702 of FIG. 7 at which the CO reference sequence generator 212 (see FIG. 2) generates a reference sequence for the subscriber line 106 (see FIG. 1). In some examples, the CO reference sequence generator 212 generates a reference sequence in response to an entry into the example service database 222 (see FIG. 2). The entry into the service database 222 may indicate that DSL service supplied to the customer premises 108 via the subscriber line 106 has been interrupted such that a service order has been placed. In some examples, the entry into the service database 222 may be performed in preparation of a possible future interruption of DSL service to the customer premises 108. In some examples, the example CO controller 202 may determine that service has been interrupted on the subscriber line 106 and thereafter cause the CO reference sequence generator 212 to generate the reference sequence.

The CO reference sequence generator 212 stores the reference sequence in the CO reference sequence storage 214 (block 704). In some examples, the reference sequence is stored with information indicating that the reference sequence is generated at the central office 102. During an initialization phase, the CO DSL modem 218 transmits the reference sequence via the subscriber line 106 to the customer premises 108, the NSAI 104, and/or the testing tool 110 (block 706). If the CO controller 202 determines that an acknowledgement from the customer premises 108, the NSAI 104, and/or the testing tool 110 is not received within a threshold amount of time as measured by the example timer 232 (block 708), the CO out-of-band network transceiver 224 transmits the reference sequence to the customer premises 108, the NSAI 104 and/or the testing tool 110 via an out-of-band network (710). In some examples, the CO controller 202 then determines whether an acknowledgement of the reference sequence from the recipients of the reference sequence is received within a threshold amount of time (block 712). If an acknowledgement is not forthcoming, the CO controller 202 indicates that the attempt to transmit the reference sequence was unsuccessful in the example service database 222 and/or causes the CO display generator 226 to generate a message indicating the attempt was unsuccessful for display at the CO display 228 (block 714) and the method ends.

If the CO controller 202 determines an acknowledgement is received within a threshold amount of time (block 708), at some time later when electronic tagging of the subscriber line 106 is to occur, the CO controller 202 causes the CO command generator 216 to generate a command instructing the example customer premises 108 and/or the example NSAI 104 to electronically tag the subscriber line 106 (block 716). The command is transmitted to the customer premises 108 and/or the NSAI 104 and the CO controller 202 causes the CO tone generator/modem 206 to determine whether an electronic tag containing the reference sequence is detected on the subscriber line 106 (block 718). If the tag is detected, information indicating the tag was detected is entered into the service database 222 by the CO controller 202 and/or displayed at the CO display 228 (block 720). If the tag is not detected, the method ends. In some examples, in addition to ending the method, the CO controller 202 may cause information indicating that a tag was not detected to be entered into the example service database 222 and/or displayed on the example display 228.

First example machine readable instructions 800 that may be executed to implement the example customer premises 108 and the example CP electronic tagging system 306 of FIGS. 1 and 3 are represented by the flowchart shown in FIG. 8. The example machine readable instructions 800 may be executed periodically and/or aperiodically (e.g., at predetermined intervals, based on an occurrence of a predetermined event, etc., or any combination thereof). The machine readable instructions 800 begin execution at a block 810 of FIG. 8 at which the CP DSL modem 302 and/or the CP out-of-band transmitter receives a reference sequence from the central office 102 and causes the reference sequence to be stored in the CP reference sequence storage 312. In response to receiving the reference sequence, the CP acknowledgement generator 314 generates an acknowledgement of receipt of the reference sequence and causes the acknowledgement to be transmitted to the central office 102 and/or the NSAI 104 via the subscriber line 106 and/or the CP out-of-band network transceiver 323 (block 810). The CP reference sequence modifier 310 then modifies the references sequence by replacing the modem serial number include in the reference sequence with a modem serial number corresponding to the CP tone generator/modem 316, and by further replacing the device ID with a device ID corresponding to the customer premises 108. The modified reference sequence, referred to as the CP reference sequence is stored in the CP reference sequence storage 312 with information indicating that it corresponds to the customer premises 108 (block 830).

In some examples, after storing the CP reference sequence sometime later, a command to electronically tag the subscriber line 106 is received at the DSL modem and/or at the CP out-of-band network transceiver 322 and/or the CP sync signal detector 326 determines that the customer premises 108 has lost sync with the central office 102 (block 840). In response to the command and/or the loss of sync, the CP controller 308 causes the CP tone generator/modem 316 to electronically tag the subscriber line 106. In some examples, the CP signal generator 318 generates a signal that is modulated by the CP DTMF modulator/demodulator 320 and applied to the subscriber line 106 (block 850). The CP controller 308 subsequently causes the CP tone generator/modem 316 to stop electronically tagging the subscriber line 106 in response to receiving a notice/message from the central office 102 and/or NSAI 104 indicating that the electronic tag has been detected, or after a threshold amount of time has elapsed (block 860) and the method ends.

In some examples, more than a single bonded pair of circuits (e.g., "n" bonded pairs) form the subscriber line 106. In some such examples, the customer premises 108 may have information stored (e.g., in the CP information storage 324) identifying the "n" bonded pairs that form the subscriber line 106. Additionally, when the subscriber line 106 is being tested, the CP controller 308 will determine whether an electronic tag has been detected on each of the "n" bonded pairs. If any of the "n" number of pairs is not responding the CP controller 308 can proactively indicate to the central office 102 that a degraded service is detected on that subscriber line 106. Additionally, the CP controller 308 can provide information identifying the physical line (e.g., the circuit pair) at issue so that further tests and/or needed repairs can be taken.

Second example machine readable instructions 900 that may be executed (e.g., with or separately from the first example instructions 800) to implement the example customer premises 108 and the example CP electronic tagging system 306 of FIGS. 1 and 3 are represented by the flowchart shown in FIG. 9. The example machine readable instructions 900 may be executed periodically and/or aperiodically (e.g., at predetermined intervals, based on an occurrence of a predetermined event, etc., or any combination thereof). The machine readable instructions 900 begin execution at a block 910 of FIG. 9 at which the CP DSL modem 302 and/or the CP out-of-band network transceiver 322 receives a reference sequence from the central office 102 and causes the reference sequence to be stored in the CP reference sequence storage 312. In response to receiving the reference sequence, the CP acknowledgement generator 314 generates an acknowledgement of receipt of the reference sequence and causes the acknowledgement to be transmitted to the central office 102 and/or the NSAI 104 via the subscriber line 106 and/or the CP out-of-band network transceiver 322 (block 920). The CP reference sequence modifier 310 then modifies the references sequence by replacing the modem serial number include in the reference sequence with a modem serial number corresponding to the CP tone generator/modem 316 and by further replacing the device ID with a device ID corresponding to the customer premises 108 (block 930). The modified reference sequence, referred to as the CP reference sequence is stored in the CP reference sequence storage 312 with information indicating that it corresponds to the customer premises 108.

In some examples, after storing the CP reference sequence sometime later, a command to monitor the subscriber line 106 for the electronic tag is received at the CP DSL modem 302 and/or at the CP out-of-band network transceiver 322 (block 940). In response to the command, the CP controller 308 causes the CP tone generator/modem 316 to monitor the subscriber line 106 for a DTMF signal containing the electronic tag. If an electronic tag is detected by the CP tone generator/modem 316 (block 950), the CP DTMF signal modulator/demodulator 320 demodulates the signal to obtain the reference sequence encoded in the tag and the CP controller 308 stores the detected reference sequence in the CP reference sequence storage 312 with information indicating that the tag was detected on the subscriber line 106 (block 960). In some examples, the CP controller 308 generates a report indicating that the electronic tag has been detected and the CP DSL modem 302 and/or the CP out-of-band network transceiver 322 transmits the report to the central office 102, the NSAI 104 and/or the testing tool 110 (block 970) and the method ends. In some examples, if the electronic tag is not detected by the CP tone generator/modem 316 (e.g., after a timeout period) (block 950), the CP controller 308 generates a report indicating that the electronic tag has not been detected (block 980) and the method ends.

First example machine readable instructions 1000 that may be executed to implement the example NSAI 104 and the example NSAI electronic tagging system 408 of FIGS. 1 and 4 are represented by the flowchart shown in FIG. 10. The example machine readable instructions 1000 may be executed periodically and/or aperiodically (e.g., at predetermined intervals, based on an occurrence of a predetermined event, etc., or any combination thereof). The machine readable instructions 1000 begin execution at a block 1010 of FIG. 10 at which the NSAI DSL modem 402 and/or the NSAI out-of-band transceiver 432 receives a reference sequence from the central office 102, the customer premises 108, and/or the testing tool 110 and causes the reference sequence to be stored in the NSAI reference sequence storage 426. In response to receiving the reference sequence, the NSAI acknowledgement generator 428 generates an acknowledgement of receipt of the reference sequence and causes the acknowledgement to be transmitted to the central office 102, the customer premises 108, and/or the testing tool 110 via the subscriber line 106 and/or the NSAI out-of-band network transceiver 432 (block 1020). The NSAI reference sequence modifier 424 then creates a first modified reference sequence by replacing the modem serial number include in the reference sequence with a modem serial number corresponding to the first NSAI tone generator/modem 410 and by further replacing the device ID with a device ID corresponding to the NSAI 104. The NSAI reference sequence modifier 424 also creates a second modified reference sequence by replacing the modem serial number include in the received reference sequence with a modem serial number corresponding to the second NSAI tone generator/modem 412 and by further replacing the device ID with a device ID corresponding to the NSAI 104. The first and second modified reference sequences, referred to as the first NSAI reference sequence and the second NSAI reference sequence are stored in the NSAI reference sequence storage 426 with information indicating that both reference sequences correspond to the NSAI 104 (block 1030).

In some examples, sometime after storing the first and second modified NSAI reference sequences, a command to electronically tag the subscriber line 106 is received (block 1040) at the NSAI DSL modem 402 and/or at the NSAI out-of-band network transceiver 432. In response to the command, the NSAI controller 422 causes the NSAI tone generator/modem to electronically tag the subscriber line 106. In some examples, if the command to electronically tag the subscriber line 106 is received from the central office 102, the NSAI controller 422 causes the second NSAI tone generator/modem 412 to electronically tag the line with the second NSAI reference sequence, and in some examples, if the command is received from the customer premises 108, the NSAI controller 422 causes the first NSAI tone generator/modem 410 to electronically tag the subscriber line 106 with the first NSAI reference sequence (block 1050). In some examples, regardless of the source of the command, the NSAI controller 422 causes both the first and second NSAI tone generator/modems 410, 412 to electronically tag the portion of the subscriber line 106 terminating at the customer premises 108 and the portion of the subscriber line 106 terminating at the central office 102, respectively. The NSAI controller 422 subsequently causes the first and/or the second NSAI tone generator/modem(s) 410, 412 to stop electronically tagging the line in response to receiving a notice/message from the central office 102, the customer premises 108, and/or the testing tool 110 indicating that the electronic tag has been detected, or after a threshold amount of time has elapsed (block 1060), and the method ends.

Second example machine readable instructions 1100 that may be executed (e.g., with or separately from the first example instructions 1000) to implement the example NSAI 104 and the example NSAI electronic tagging system 408 of FIGS. 1 and 4 are represented by the flowchart shown in FIG. 11. The example machine readable instructions 1100 may be executed periodically and/or aperiodically (e.g., at predetermined intervals, based on an occurrence of a predetermined event, etc., or any combination thereof). The machine readable instructions 1100 begin execution at a block 1110 of FIG. 11 at which the NSAI DSL modem 402 and/or the NSAI out-of-band transceiver 432 receives a reference sequence from the central office 102, the customer premises 108 and/or the testing tool 110 and causes the reference sequence to be stored in the NSAI reference sequence storage 426 (block 1110). In response to receiving the reference sequence, the NSAI acknowledgement generator 428 generates an acknowledgement of receipt of the reference sequence and causes the acknowledgement to be transmitted to the central office 102, the customer premises 108, and/or the testing tool 110 via the subscriber line 106 and/or the out-of-band network transceiver 432 (block 1120). The NSAI reference sequence modifier 424 then creates a first modified reference sequence by replacing the modem serial number include in the reference sequence with a modem serial number corresponding to the first NSAI tone generator/modem 410 and by further replacing the device ID with a device ID corresponding to the NSAI 104. The NSAI reference sequence modifier 424 also creates a second modified reference sequence by replacing the modem serial number include in the received reference sequence with a modem serial number corresponding to the second NSAI tone generator/modem 412 and by further replacing the device ID with a device ID corresponding to the NSAI 104. The first and second modified reference sequences, referred to as the first NSAI reference sequence and the second NSAI reference sequence are stored in the NSAI reference sequence storage 426 with information indicating that both reference sequences correspond to the NSAI 104 (block 1130).

In some examples, sometime after storing the first NSAI reference sequence and the second NSAI reference sequence, a command to monitor the subscriber line 106 for an electronic tag is received at the NSAI DSL modem 402 and/or at the NSAI out-of-band network transceiver 432 (block 1140). In response to the command, the NSAI controller 422 causes the first NSAI tone generator/modem 410 and the second NSAI tone generator/modem 412 to monitor the subscriber line 106 for a DTMF signal containing the electronic tag (block 1150). If an electronic tag is detected, the first NSAI DTMF modulator/demodulator 416 and/or the second NSAI DTMF modulator/demodulator 420 demodulates the signal to obtain the reference sequence encoded in the tag and the NSAI controller 422 stores the detected reference sequence in the NSAI reference sequence storage 426 with information indicating that the tag was detected on the subscriber line 106 (block 1160). In some examples, the NSAI controller 422 generates a report indicating that the electronic tag has been detected and the NSAI DSL modem 402 and/or the NSAI out-of-band network transceiver 432 transmits the report to the central office 102, the customer premises 108 and/or the testing tool 110 (block 1170) and the method ends. In some examples, if the electronic tag is not detected by the first and/or the second NSAI tone generator/modem 410, 412 (e.g., after a timeout period) (block 1150), the NSAI controller 422 generates a report indicating that the electronic tag has not been detected (block 1180) and the method ends.

Example machine readable instructions 1200 that may be executed to implement the example testing tool 110 of FIGS. 1 and 5 are represented by the flowchart shown in FIG. 12. The example machine readable instructions 1200 may be executed periodically and/or aperiodically (e.g., at predetermined intervals, based on an occurrence of a predetermined event, etc., or any combination thereof). The machine readable instructions 1200 begin execution at a block 1210 at which the testing tool out-of-band network transceiver 502 receives a reference sequence from the central office 102, the customer premises 108 and/or the NSAI 104 and causes the reference sequence to be stored in the testing tool reference sequence storage 510 as the expected reference sequence. In some examples, the expected reference sequence is stored with information indicating the source of the reference sequence (e.g., the central office 102, the customer premises 108, the NSAI 104). In response to receiving the reference sequence, the testing tool acknowledgement generator 506 generates an acknowledgement of receipt of the reference sequence and causes the acknowledgement to be transmitted to the central office 102, the customer premises 108, and/or the NSAI 104 via the testing tool out-of-band network transceiver 502 (block 1220).

In addition to receiving the reference sequence, a notification indicating that the subscriber line 106 has been electronically tagged is also received at the testing tool out-of-band network transceiver 502 (block 1230). In response to the notification, the testing tool display generator 512 generates a message indicating that the subscriber line 106 has been electronically tagged for display at the testing tool display 514 (also at the block 1230). In response, the field personnel operating the testing tool 110 selects a wire believed to be the subscriber line of interest (i.e., the subscriber line that has been electronically tagged) and places the testing tool 110 within sufficient proximity of the wire to enable detection of the electronic tag. The controller then causes the testing tool 110 tone generator/modem 516 to begin sensing for a magnetic field generated by the selected wire (block 1240).

In some examples, if the example magnetic field sensor 520 does not detect a magnetic field (block 1250), the example testing tool display generator 512 generates a display indicating that a field is not detected for display at the testing tool display 514 (block 1255). In response to the displayed message, the field operator selects another wire to test, re-positions the testing tool 110 in the proximity of the next wire to be tested and the testing tool 110 again attempts to detect a magnetic field as described above with respect to the block 1240.

If a magnetic field is detected (block 1250), the example magnetic field DTMF signal modulator/demodulator 524 demodulates the detected magnetic field to obtain the reference sequence and the causes the detected reference sequence to be stored in the reference sequence storage (block 1260). The example testing tool sequence comparator 518 then compares the detected sequence to the expected reference sequence (block 1270). The example testing tool display generator 512 then generates a display indicating the outcome of the comparison (e.g., indicating whether the detected reference sequence matches the expected reference sequence) (block 1280) and, in some examples, transmits the message to the central office 102 for display and/or storage at the central office 102. If the detected reference sequence matches the expected reference sequence, the field operator determines that the selected wire is confirmed to be the subscriber line of interest and the method ends. If the detected reference sequence does not match the expected reference sequence, the wire being tested is not assumed to be the subscriber line of interest. Thus, the field operator selects another wire to test, repositions the testing tool 110 in the proximity of that wire and the testing tool 110 again attempts to detect the electronic tag as described above with respect to the block 1240. The method continues in the manner described above until all wires have been tested or until a wire is confirmed as being the subscriber line of interest.

Figure 13:
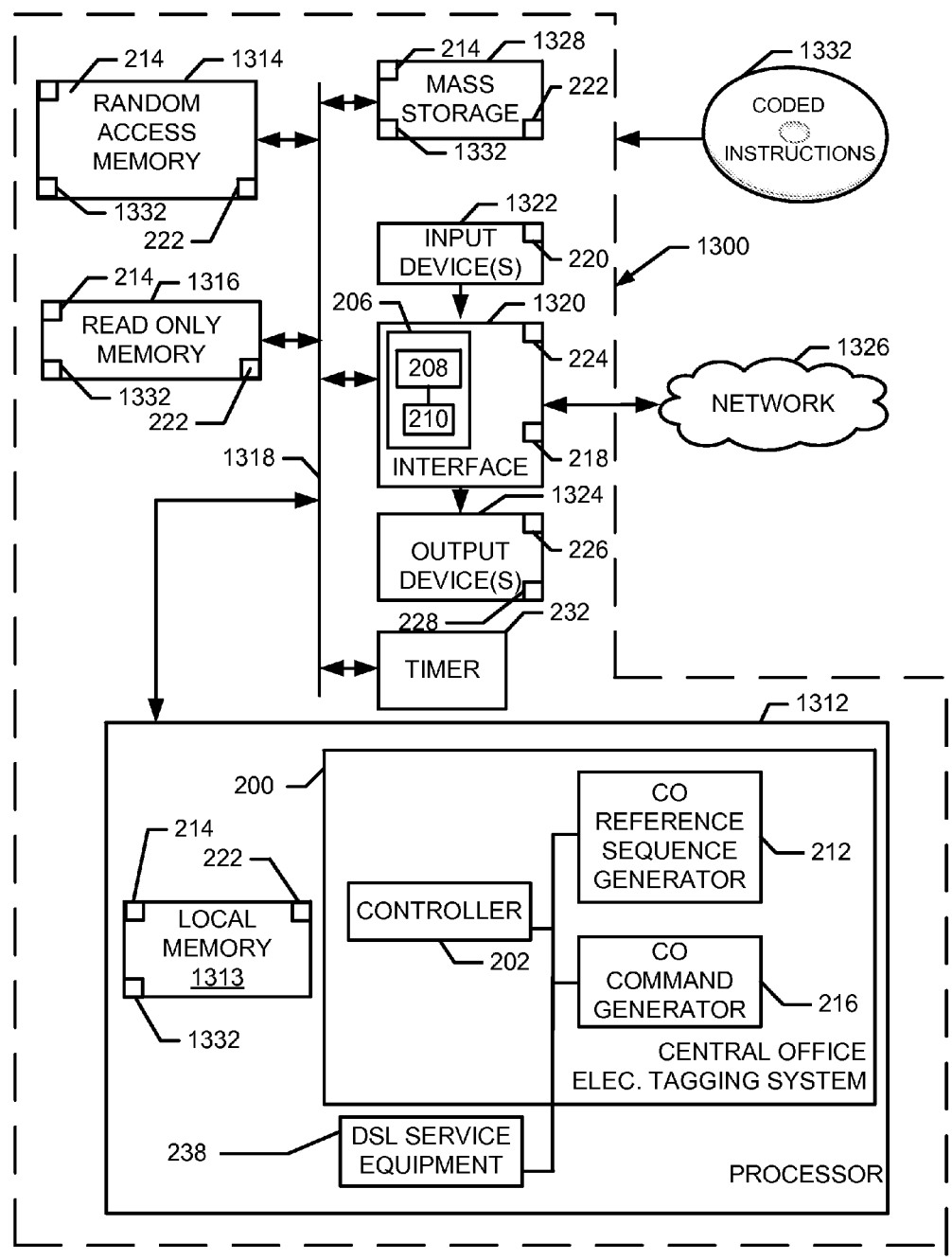
FIG. 13 is a block diagram of an example processing system that may execute the example machine readable instructions of FIG. 6 and/or FIG. 7 to implement the example central office 102 of FIG. 1 and/or the example central office electronic tagging system 200 of FIG. 2.

FIG. 13 is a block diagram of an example processor platform 1300 structured to execute the instructions of FIG. 6 and FIG. 7 to implement the central office 102 of FIG. 1 and FIG. 2, and the central office electronic tagging system 200 of FIG. 2. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example of FIG. 13, the processor 1312 is configured via example instructions 1332 to implement the example controller 202, the example CO reference sequence generator 212, and the example CO command generator 216. In some examples, the processor 1412 may be used to implement the example CO DSL service equipment 230. In some examples, the processor platform 1300 includes the example timer 232.

The processor 1312 of the illustrated example includes a local memory 1313 (e.g., a cache). In some examples, the local memory 1313 may implement the example CO reference sequence storage 214 and the example service database 222. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller. In some examples, the volatile memory 1314, and/or the non-volatile memory 1316 may implement the example CO reference sequence storage 214 and the example service database 222.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a keyboard, a button, a mouse, a touchscreen, a track-pad, a trackball, isopoint and/or a voice recognition system. In the illustrated example of FIG. 13, the input device(s) includes the CO data input tool 220.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor. In the illustrated example of FIG. 13, the output device(s) includes the example CO display generator 226 and the example CO display 228.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.). In the illustrated example of FIG. 13, the interface includes the example CO tone generator/modem 206, the example CO DTMF signal modulator/demodulator 208 and the example CO signal generator 210.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives. In the illustrated example of FIG. 13, the mass storage device 1328 implements the example CO reference sequence storage 214 and the example service database 222.

Coded instructions 1332 corresponding to the instructions of FIGS. 6 and 7 may be stored in the mass storage device 1328, in the volatile memory 1314, in the non-volatile memory 1316, and/or on a removable tangible computer readable storage medium such as a CD or DVD.

Figure 14:
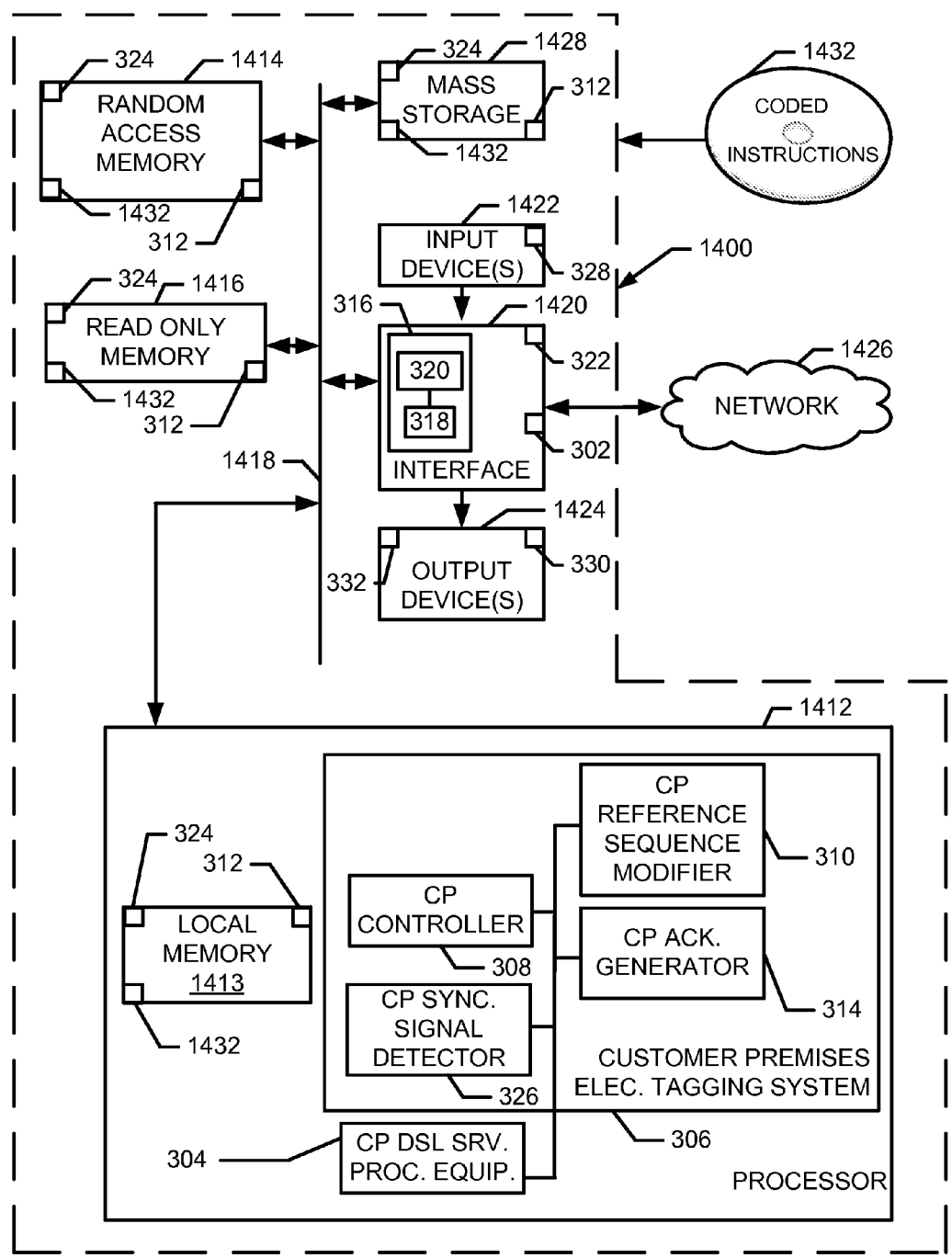
FIG. 14 is a block diagram of an example processing system that may execute the example machine readable instructions of FIG. 8 and/or FIG. 9 to implement the example customer premises 108 of FIG. 1 and the example CP electronic tagging system 306 of FIG. 3.

FIG. 14 is a block diagram of an example processor platform 1400 structured to execute the instructions of FIG. 8 and FIG. 9 to implement the example customer premises 108 and the example customer premises electronic tagging system 306 of FIGS. 1 and 3. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer. In the illustrated example of FIG. 14, the processor 1412 is configured via example instructions 1432 to implement the example CP controller 308, the example CP reference sequence modifier 310, the example CP acknowledgement generator 314, and the example CP sync signal detector 326. In some examples, the processor 1412 may be used to implement the CP DSL service processing equipment 304.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller. In some examples, the volatile memory 1414, and/or the non-volatile memory 1416 may implement the example CP reference sequence storage 312 and the example CP information storage 324.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a keyboard, a button, a mouse, a touchscreen, a track-pad, a trackball, isopoint and/or a voice recognition system. In the illustrated example of FIG. 14, the input device(s) includes the example CP input tool 328.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor. In the illustrated example of FIG. 14, the output device(s) includes the example CP display generator 330 and the example CP display 332.

The interface circuit 1420 of the illustrated example also includes a communication device such as a transmitter, a receiver, a transceiver, a modem and/or network interface card to facilitate exchange of data with external machines (e.g., computing devices of any kind) via a network 1426

(e.g., an Ethernet connection, a digital subscriber line (DSL), a telephone line, coaxial cable, a cellular telephone system, etc.). In the illustrated example of FIG. 14, the interface circuit 1420 includes the example CP DSL modem 302, the example CP out-of-band network transceiver 322, the example CP tone generator/modem 316, the example CP signal generator 318 and the example CP DTMF signal modulator/demodulator 320.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives. In the illustrated example of FIG. 13, the mass storage device 1428 implements the example CP reference sequence storage 312 and the example CP information storage 324.

Coded instructions 1432 corresponding to the instructions of FIGS. 8 and 9 may be stored in the mass storage device 1428, in the volatile memory 1414, in the non-volatile memory 1416, and/or on a removable tangible computer readable storage medium such as a CD or DVD.

Figure 15:
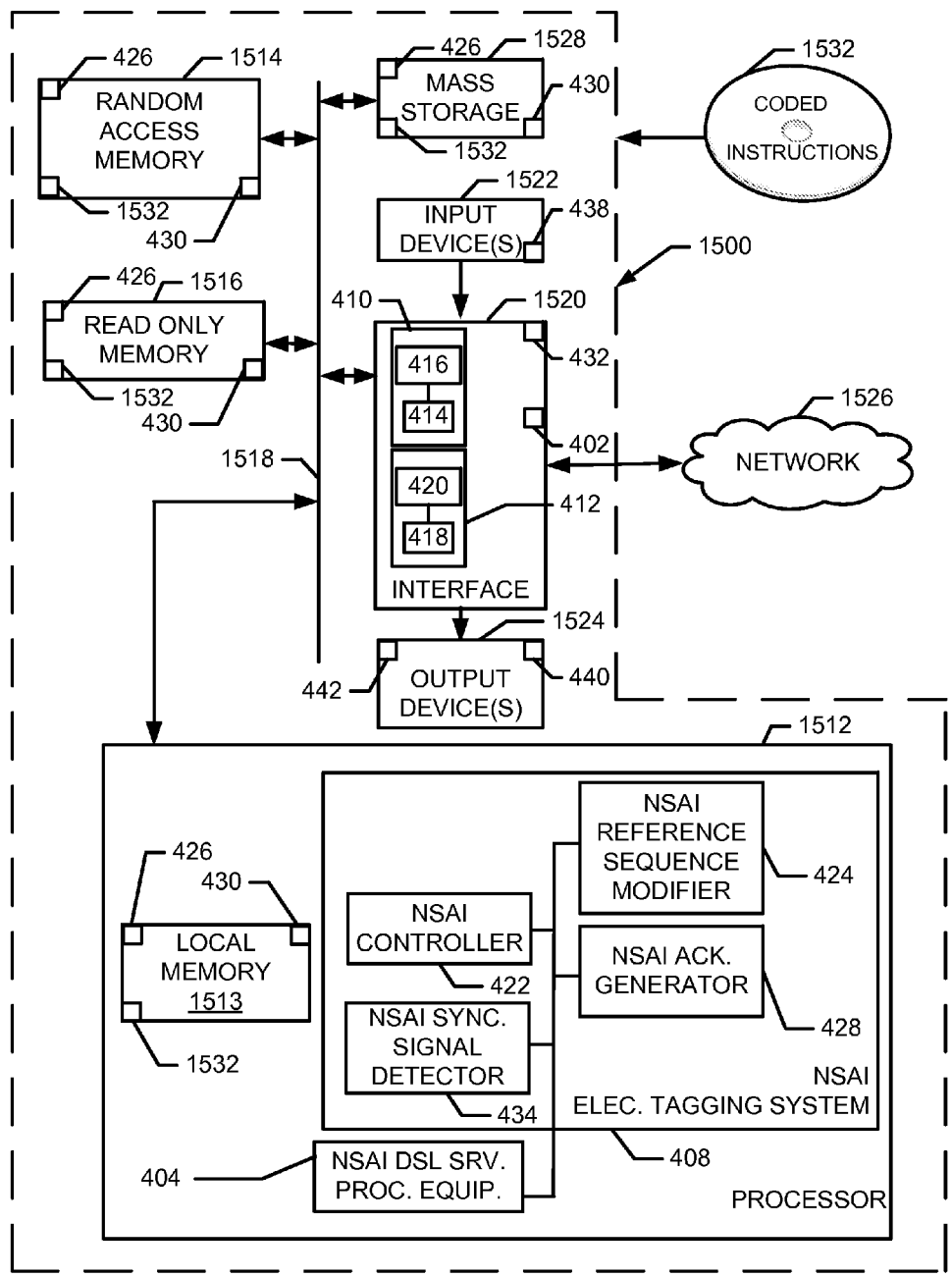
FIG. 15 is a block diagram of an example processing system that may execute the example machine readable instructions of FIG. 10 and/or FIG. 11 to implement the example neighborhood serving area interface ("NSAI") 104 of FIG. 1 and the NSAI electronic tagging system 408 of FIG. 4.

FIG. 15 is a block diagram of an example processor platform 1500 structured to execute the instructions of FIG. 10 and FIG. 11 to implement the example NSAI 104 and the example NSAI electronic tagging system 408 of FIGS. 1 and 4. The processor platform 1500 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer. In the illustrated example of FIG. 15, the processor 1512 is configured via example instructions 1532 to implement the example NSAI controller 422, the example NSAI reference sequence modifier 424, the example NSAI acknowledgement generator 428, and the example NSAI sync signal detector 434. In some examples, the processor 1512 may be used to implement the NSAI DSL service processing equipment 404.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller. In some examples, the volatile memory 1514, and/or the non-volatile memory 1516 may implement the example NSAI reference sequence storage 426 and the example NSAI information storage 430.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a keyboard, a button, a mouse, a touchscreen, a track-pad, a trackball, isopoint and/or a voice recognition system. In the illustrated example of FIG. 15, the input device(s) includes the example NSIA input tool 438.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor. In the illustrated example of FIG. 15, the output device(s) includes the example NSAI display generator 440 and the example NSAI display 442.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.). In the illustrated example of FIG. 15, the interface circuit 1520 includes the example NSAI DSL modem 402, the example NSAI out-of-band network transceiver 432, the example first NSAI tone generator/modem 410, the example NSAI signal generator 414, the example NSAI DTMF signal modulator/demodulator 416, the example second NSAI tone generator/modem 412, the example NSAI signal generator 418, and the example NSAI DTMF signal modulator/demodulator 420.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives. In the illustrated example of FIG. 15, the mass storage device 1528 implements the example NSAI reference sequence storage 426 and the example NSAI information storage 430.

Coded instructions 1532 corresponding to the instructions of FIGS. 10 and 11 may be stored in the mass storage device 1528, in the volatile memory 1414, in the non-volatile memory 1416, and/or on a removable tangible computer readable storage medium such as a CD or DVD.

Figure 16:
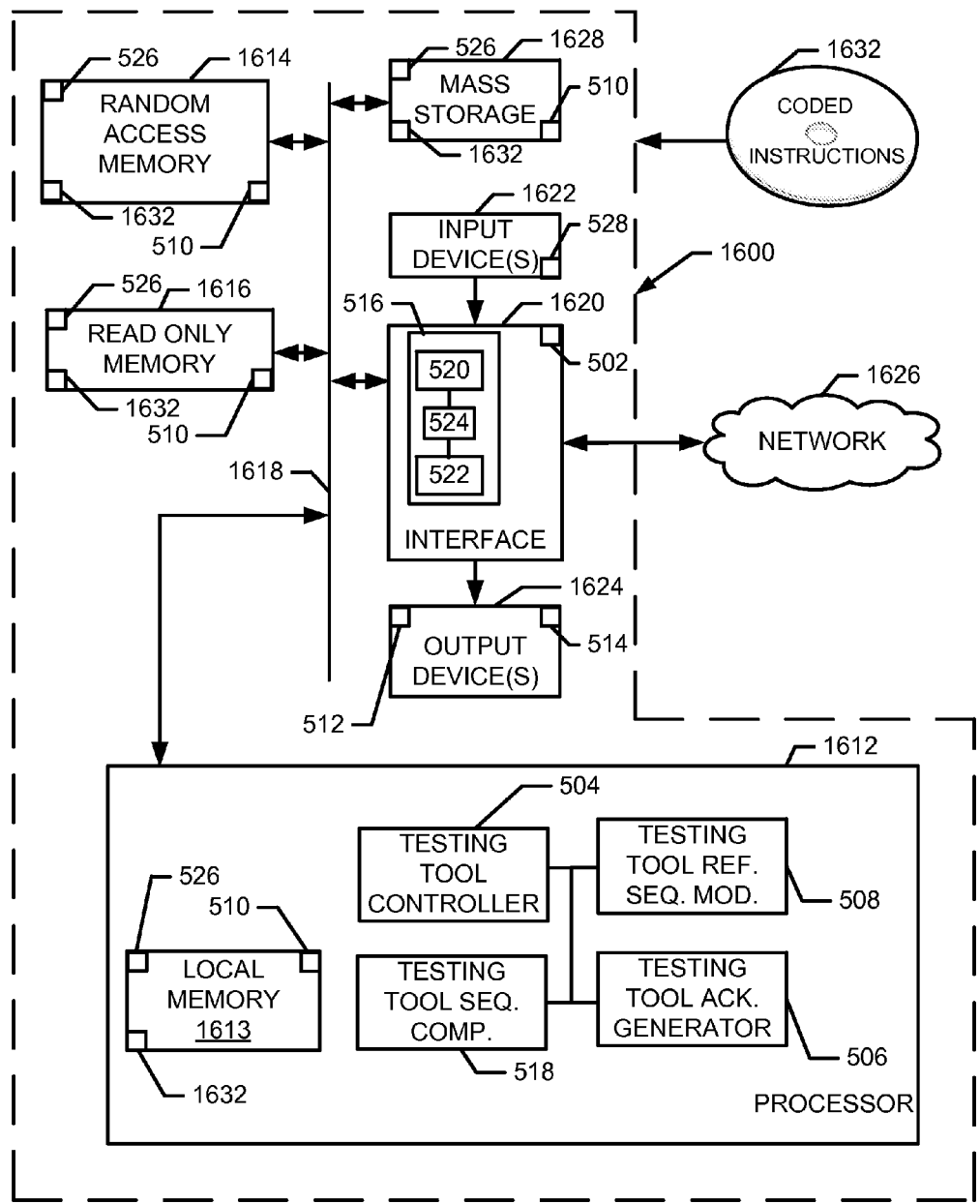
FIG. 16 is a block diagram of an example processing system that may execute the example machine readable instructions of FIG. 12 to implement the example testing tool of FIG. 1 and FIG. 5.

FIG. 16 is a block diagram of an example processor platform 1600 structured to execute the instructions of FIG. 12 to implement the example testing tool 110 of FIGS. 1 and 5. The processor platform 1600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer. In the illustrated example of FIG. 16, the processor 1612 is configured via example instructions 1632 to implement the example testing tool controller 504, the example testing tool reference sequence modifier 508, the example testing tool acknowledgement generator 506, and the example testing tool sequence comparator 518.

The processor 1612 of the illustrated example includes a local memory 1613 (e.g., a cache). The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller. In some examples, the volatile memory 1614, and/or the non-volatile memory 1616 may implement the example testing tool reference sequence storage 510 and the example testing tool information storage 526.

The processor platform 1600 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a keyboard, a button, a mouse, a touchscreen, a track-pad, a trackball, isopoint and/or a voice recognition system. In the illustrated example of FIG. 16, the input device(s) includes the example testing tool input tool 528.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor. In the illustrated example of FIG. 16, the output device(s) includes the example testing tool display generator 512 and the example testing tool display 514.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.). In the illustrated example of FIG. 16, the interface circuit 1620 includes the example testing tool out-of-band network transceiver 502.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and digital versatile disk (DVD) drives. In the illustrated example of FIG. 16, the mass storage device 1628 implements the example testing tool reference sequence storage 510 and the example testing tool information storage 526.

Coded instructions 1632 corresponding to the instructions of FIG. 12 may be stored in the mass storage device 1628, in the volatile memory 1614, in the non-volatile memory 1616, and/or on a removable tangible computer readable storage medium such as a CD or DVD.

At least some of the above described example methods and/or apparatus are implemented by one or more software and/or firmware programs running on a computer processor. However, dedicated hardware implementations including, but not limited to, application specific integrated circuits, programmable logic arrays and other hardware devices may likewise be constructed to implement some or all of the example methods and/or apparatus described herein, either in whole or in part. Furthermore, alternative software implementations including, but not limited to, distributed processing or component/object distributed processing, parallel processing, or virtual machine processing may also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software.

Thus, the methods, systems, apparatus and articles of manufacture disclosed herein permit the electronic tagging of a subscriber line of interest using example electronic tagging systems installed at an example central office, an example customer premises and/or an example NSAI. As a result, a field operator using the example testing tool described herein can identify a subscriber line of interest without having to first disconnect and thereby interrupt DSL service being supplied via the subscriber line. Thus, the time-consuming, tedious, and sometimes infeasible task of manually tracing a subscriber line to thereby identify a subscriber line in need of repair is eliminated. Further, the possibility that a fully operational subscriber line (not in need of repair) is erroneously disrupted is eliminated. In addition, the methods, apparatus, systems and articles of manufacture described herein can be used to determine the continuity of an existing subscriber line without need to send a field operator out to the field thereby resulting in cost savings and a reduction of manpower.

Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to electronically tag a circuit pair, comprising:
generating circuit identifying information to be included in a tag;
transmitting the circuit identifying information to a first network element and to a portable circuit probe;
electronically tagging the circuit pair by applying a tone to the circuit pair at the first network element, the tone being encoded to include the tag;
notifying the portable circuit probe that the circuit has been electronically tagged;
transmitting the circuit identifying information to a second network element; and
instructing the second network element to transmit the tag including the circuit identifying information.

2. The method of claim 1, wherein the tag information is transmitted to the first network element via the circuit pair and, if the first network element fails to acknowledge receipt of the tag, the tag is transmitted to the first network element via an out-of-band network.

3. The method of claim 2, wherein the out-of-band network includes at least one of an 802.11x compliant network, a cellular telephone network, and an ad-hoc network.

4. The method of claim 1, wherein the first network element includes at least one of a digital subscriber line access multiplexer, a circuit switch, a video ready access device, and a consumer premises equipment modem.

5. The method of claim 1, wherein the circuit identifying information includes an attribute label and an attribute separator.

6. The method of claim 5, further including modifying respective an attribute included in the attribute label to indicate a transmission source of the circuit identifying information.

7. The method of claim 1, further including electronically tagging the circuit pair in response to detecting a loss of synchronization with the first network element.

8. The method of claim 7, wherein the loss of synchronization occurs between the first network element and the second network element.

9. The method of claim 1, further including instructing the first network element to monitor the circuit pair for the tag generated by the second network element.

10. A tangible computer readable storage medium including computer readable instructions which, when executed, cause a computer to perform operations including:
transmitting a reference sequence to a first network element and to a portable circuit probe, the reference sequence to be included in a tag;
electronically tagging a circuit pair by applying a tone to the circuit pair at a first network element, the tone being encoded to include the reference sequence;
notifying the portable circuit probe that the circuit has been electronically tagged;
transmitting the reference sequence to a second network element; and
instructing the second network element to generate the reference sequence on the circuit pair.

11. The tangible computer readable storage medium of claim 10, wherein the reference sequence is transmitted to the first network element via the circuit pair, and wherein the operations further include:
determining whether the first network element acknowledges receipt of the reference sequence; and
if the first network element fails to acknowledge receipt of the reference sequence, transmitting the reference sequence to the first network element via an out-of-band network.

12. The tangible computer readable storage medium of claim 10, wherein the reference sequence includes a set of attributes and a set of attribute separators, and wherein the operations further include modifying ones of the attributes to indicate a transmission source of the tag.

13. An apparatus to electronically tag a digital subscriber line, the apparatus comprising:
a memory having machine readable instructions stored thereon; and
a processor to execute the instructions to perform operations including:
generating identifying information to be included in the tag;
transmitting the identifying information to a first network element and to a portable testing tool;
electronically tagging the digital subscriber line by applying a tone to the digital subscriber line at the first network element, the tone being encoded to include the identifying information;
notifying the portable testing tool that the digital subscriber line has been electronically tagged;
transmitting the identifying information to a second network element; and
instructing the second network element to electronically tag the digital subscriber line with the identifying information.

14. The apparatus as defined in claim 13, wherein the operations further include instructing the first network element to monitor the digital subscriber line for the tag containing the identifying information generated by the second network element.

15. The apparatus of claim 13, wherein the first network element includes at least one of a digital subscriber line access multiplexer, a circuit switch, a video ready access device, and a consumer premises modem.

16. The apparatus of claim 13, wherein the operations further include electronically tagging the digital subscriber line in response to detecting a loss of synchronization with the first network element.

17. The apparatus of claim 16, wherein the loss of synchronization occurs between the first network element and the second network element.

* * * * *

UNITED STATES PATENT AND TRADEMARK OFFICE
CERTIFICATE OF CORRECTION

| | |
|---|---|
| PATENT NO. | : 9,462,101 B2 |
| APPLICATION NO. | : 14/571234 |
| DATED | : October 4, 2016 |
| INVENTOR(S) | : Kreiner et al. |

It is certified that error appears in the above-identified patent and that said Letters Patent is hereby corrected as shown below:

On the Title Page

(72) Inventors: remove "Barret M. Kreiner" and insert -- Barrett M. Kreiner --.

Signed and Sealed this
Fourth Day of September, 2018

Andrei Iancu
*Director of the United States Patent and Trademark Office*